(12) United States Patent
Lert, Jr. et al.

(10) Patent No.: US 12,134,518 B2
(45) Date of Patent: Nov. 5, 2024

(54) TRANSPORT RACK CARTRIDGE (TRC)

(71) Applicant: Walmart Apollo, LLC, Bentonville, AR (US)

(72) Inventors: John G. Lert, Jr., Wakefield, MA (US); William J. Fosnight, Windham, NH (US)

(73) Assignee: WALMART APOLLO. LLC, Bentonville (AR)

( * ) Notice: Subject to any disclaimer, the term of this patent is extended or adjusted under 35 U.S.C. 154(b) by 824 days.

(21) Appl. No.: 17/236,082

(22) Filed: Apr. 21, 2021

(65) Prior Publication Data
US 2021/0323769 A1 Oct. 21, 2021

Related U.S. Application Data

(60) Provisional application No. 63/013,504, filed on Apr. 21, 2020.

(51) Int. Cl.
*B65G 1/10* (2006.01)
*B65G 1/04* (2006.01)
*B65G 1/137* (2006.01)

(52) U.S. Cl.
CPC ......... *B65G 1/1375* (2013.01); *B65G 1/0492* (2013.01); *B65G 1/10* (2013.01); *B65G 1/1371* (2013.01)

(58) Field of Classification Search
CPC ...... B65G 1/1375; B65G 1/0492; B65G 1/10; B65G 1/1371; A47B 53/02
See application file for complete search history.

(56) References Cited

U.S. PATENT DOCUMENTS

| | | | | | |
|---|---|---|---|---|---|
| 2,772,639 | A | * | 12/1956 | Ingold | A47B 53/02 104/173.1 |
| 4,557,534 | A | * | 12/1985 | Dahnert | A47B 53/02 312/201 |
| 5,333,983 | A | * | 8/1994 | Hatouchi | A47B 53/02 700/214 |
| 6,112,917 | A | * | 9/2000 | Baker | A47B 53/02 384/58 |
| 6,471,309 | B1 | * | 10/2002 | Turner | A47F 5/10 312/201 |

(Continued)

FOREIGN PATENT DOCUMENTS

| JP | H05170304 | 7/1993 |
|---|---|---|
| JP | H07109011 | 4/1995 |

OTHER PUBLICATIONS

International Search Report and Written Opinion dated Jul. 19, 2021 in International Patent Application No. PCT/US2021/028356.

(Continued)

*Primary Examiner* — Patrick H Mackey
(74) *Attorney, Agent, or Firm* — Fitch, Even, Tabin & Flannery LLP

(57) ABSTRACT

A rack or racking system is disclosed for use in inventory management, order fulfillment and automation-based capacity planning. The racking system includes expandable and collapsible racks used to transport containers, for example, totes, which in the expanded configuration can attach to a load/unload fixture that enables bots to load totes onto the racks and/or unload totes from the racks, and in the collapsed configuration can be loaded onto a truck that transports the totes between facilities.

23 Claims, 30 Drawing Sheets

(56) References Cited

U.S. PATENT DOCUMENTS

| | | | | |
|---|---|---|---|---|
| 6,669,314 | B1* | 12/2003 | Nemec | A47B 53/02 312/201 |
| 7,261,210 | B2* | 8/2007 | Hatanaka | A47B 53/02 211/1.51 |
| 8,731,740 | B2* | 5/2014 | Ogawa | B65G 1/06 701/1 |
| 9,242,796 | B1* | 1/2016 | Krick | G11B 15/683 |
| 11,897,696 | B1* | 2/2024 | Perraut | G06Q 10/06315 |
| 2004/0052620 | A1* | 3/2004 | Schieleit | B65G 1/0478 414/281 |
| 2008/0237165 | A1* | 10/2008 | Bobis | A47B 53/02 211/151 |
| 2016/0236869 | A1* | 8/2016 | Kimura | G05D 1/0291 |
| 2016/0318721 | A1 | 11/2016 | Johnston | |
| 2017/0313514 | A1 | 11/2017 | Lert, Jr. | |
| 2018/0074504 | A1 | 3/2018 | Shydo, Jr. | |
| 2018/0082162 | A1 | 3/2018 | Durham et al. | |
| 2018/0134492 | A1 | 5/2018 | Lert, Jr. | |
| 2018/0150793 | A1 | 5/2018 | Lert, Jr. | |
| 2018/0194556 | A1 | 7/2018 | Lert, Jr. | |
| 2018/0247257 | A1 | 8/2018 | Lert, Jr. | |
| 2018/0341908 | A1 | 11/2018 | Lert, Jr. et al. | |
| 2019/0233212 | A1 | 8/2019 | Mountz et al. | |
| 2020/0039553 | A1 | 2/2020 | Abohammdan et al. | |
| 2020/0065748 | A1 | 2/2020 | Durkee et al. | |
| 2020/0283229 | A1 | 9/2020 | Edwards et al. | |
| 2020/0338597 | A1 | 10/2020 | Kalm et al. | |
| 2020/0369171 | A1 | 11/2020 | Schweitzer et al. | |
| 2021/0081887 | A1 | 3/2021 | Durkee et al. | |

OTHER PUBLICATIONS

English language Abstract for H05170304 published Jul. 9, 1993.
English language Abstract for H07109011 published Apr. 25, 1995.

\* cited by examiner

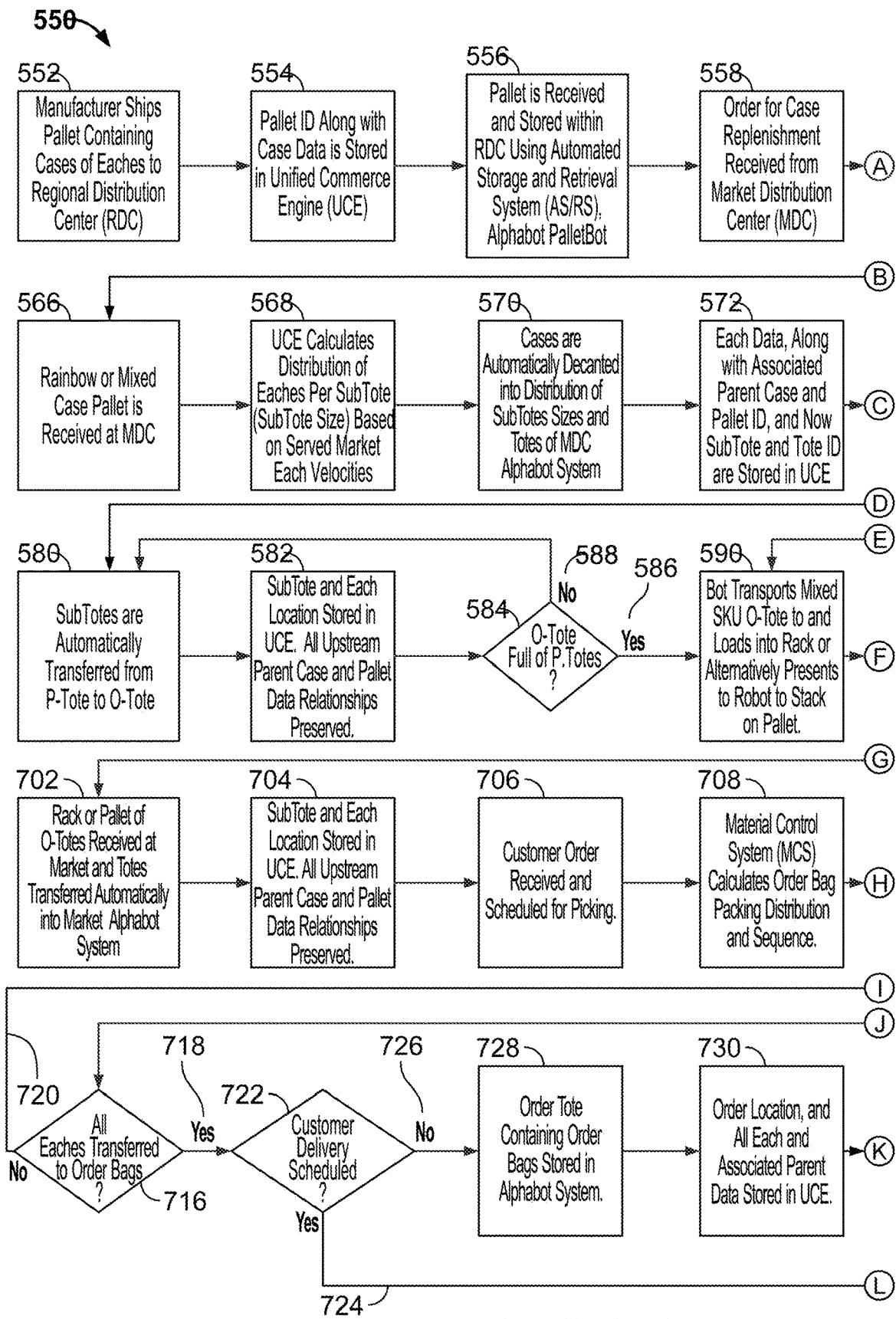
Figure 26  Automated Retail Supply Chain

TRANSPORT RACK CARTRIDGE (TRC)

PRIORITY DATA

The present application claims priority to U.S. Provisional Patent Application No. 63/013,504, filed on Apr. 21, 2020, entitled "TRANSPORT RACK CARTRIDGE (TRC)", which application is incorporated by reference herein in its entirety.

FIELD OF THE INVENTION

The exemplary and non-limiting embodiments described herein relate generally to an automated retail supply chain storage and retrieval system, and more particularly to a racking system for use in inventory management, order fulfillment and automation-based capacity planning.

BACKGROUND

In a conventional order fulfilment facility, inventory, also referred to as "eaches" are received at the facility pallets of cases including eaches. Conventionally, received eaches are stripped of their packaging, organized by Stock Keeping Unit or "SKU," and then transferred to storage containers for storage until needed. Thereafter, the eaches may be removed from the storage shelves, repackaged, and shipped to the next destination such as for example a retail store. There is a need to more efficiently transfer eaches to and from an order fulfilment facility.

SUMMARY

Embodiments of the present technology relate to a rack or racking system for use in inventory management, order fulfillment and automation-based capacity planning. The racking system includes expandable and collapsible racks used to transport containers, for example, totes, which in the expanded configuration can attach to a load/unload fixture that enables bots to load totes onto the racks and/or unload totes from the racks, and in the collapsed configuration can be loaded onto a truck that transports the totes between facilities.

In one example, the present technology relates to a racking system configured to operate with an automatic storage and retrieval system (ASRS) having mobile robots transferring containers to and from storage locations in a storage structure, the racking system comprising: a first tote support structure; and a second tote support structure, the first and second tote support structures capable of moving with respect to each other between a first position where the first and second tote support structures are configured with an aisle between the first and second tote support structures and configured to receive containers from a mobile robot of the mobile robots from the ASRS travelling within the aisle, and a second position where the first and second tote support structures are compacted for transport.

In another example, the present technology relates to an automated storage and retrieval system (ASRS), comprising: a first plurality of storage shelves arranged in an array of rows and columns; a second plurality of storage shelves arranged in an array of rows and columns; an aisle separating the first and second plurality of storage shelves, the first plurality of storage shelves, the second plurality of storage shelves and aisle together configured to allow a mobile robot to travel vertically and horizontally within the aisle to transfer containers to and from any of the first and second plurality of storage shelves; a first section of the first plurality of storage shelves and a second section of the second plurality of storage shelves together being removable as a modular section, the modular section configured to move between a first position, where the first and second sections are spaced apart from each other and configured to receive the mobile robot therebetween, and a second position where the first and second sections are compacted toward each other for transport of the modular section away from the ASRS.

In a further example, the present technology relates to an automated storage and retrieval system (ASRS), comprising: a plurality of modular racks, each modular rack comprising: a first tote support structure, and a second tote support structure, the first and second tote support structures capable of moving with respect to each other between a first position where the first and second tote support structures are configured with an aisle between the first and second tote support structures and configured to receive containers from a mobile robot travelling horizontally within the aisle at one of multiple levels, and a second position where the first and second tote support structures are compacted for transport; and a rack docking module configured to affix to an end of one or more of the plurality of modular racks, the rack docking module raising and lowering the mobile robot to travel at different levels of the multiple levels between the first and second support structures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
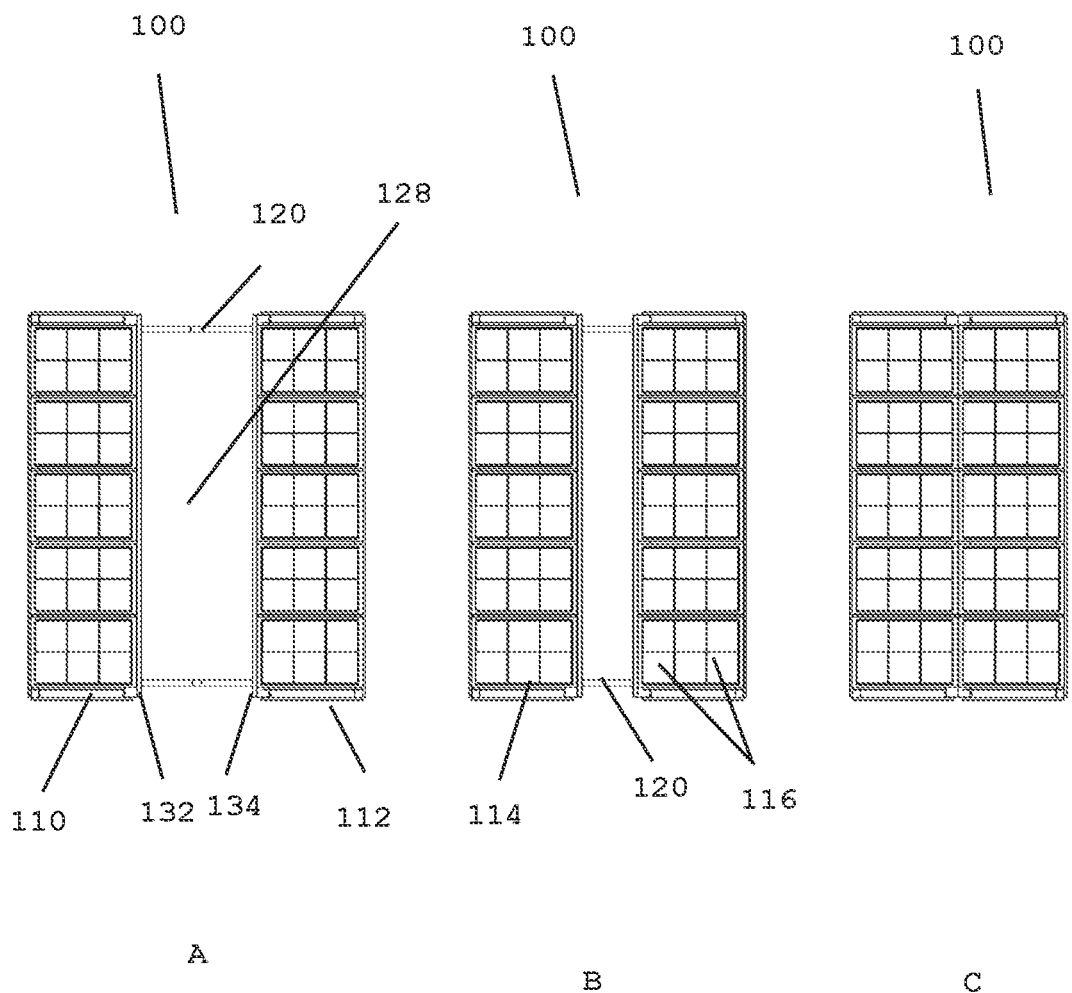
FIGS. 1-3 are top, end and perspective views of racks according to embodiments of the present technology.

Embodiments of the present technology will now be described with reference to the figures, which in general relate to a rack or racking system for use in inventory management, order fulfillment and automation-based capacity planning. More specifically, the technology relates to an expandable and collapsible rack or racking system used to transport containers, for example, totes, which in the expanded configuration can attach to a load/unload fixture that enables bots to load totes onto the rack and/or unload totes from the rack, and in the collapsed configuration can be loaded onto a truck that transports the totes between facilities.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±0.25%.

The racking systems disclosed may be used in conjunction with a robotic picking system(s) and robotics, for example, as disclosed in U.S. Patent Publication Number US2017/0313514 A1 having publication date Nov. 2, 2017 and entitled "Order Fulfillment System" which is incorporated by reference herein in its entirety. Similarly, the racking systems disclosed may be used in conjunction with a robotic picking system(s) and robotics that are deployed in conjunction with retail store formats, for example, as disclosed in U.S. Patent Publication Number US2018/0134492 A1 having publication date May 17, 2018 and entitled "Automated-Service Retail System and Method" which is incorporated by reference herein in its entirety. Further, the racking systems disclosed herein may be used in conjunction with different elements of full or partially automated supply chain systems, for example, as disclosed in the following: U.S. Patent Publication Number US2018/0150793 A1 having publication date May 31, 2018 and entitled "Automated Retail Supply Chain and Inventory Management System"; U.S. Patent Publication Number US2018/0194556 A1 having publication date Jul. 12, 2018 and entitled "Interchangeable Automated Mobile Robots with a Plurality of Operating Modes Configuring a Plurality of Different Robot Task capabilities"; U.S. Patent Publication Number US2018/0247257 A1 having publication date Aug. 30, 2018 and entitled "Inventory Management System and Method" and U.S. Patent Publication Number US2018/0341908 A1 having publication date Nov. 29, 2018 and entitled "Fully Automated Self Service Store", all of which are incorporated by reference herein in their entirety, and some of which is expressly incorporated below.

The racking systems disclosed may be utilized in the foregoing examples and further by way of non-limiting example in applications such as summarized in Table 1:

TABLE 1

| CLASSIFICATION | IN | OUT |
| --- | --- | --- |
| DC (Distribution Center) | Pallets | Rainbow Pallets |
| RDC (Regional Distribution Center) | Pallets, Rainbow Pallets, Empty Totes | Single & Mixed SKU Product Totes |
| Darkstore | Single & Mixed SKU Product Totes, Empty Totes | Order Totes, Empty Totes |
| RSD (Remote Storage Dispense) | Order Totes | Empty Totes |
| SPSD (Store Picking & Storage Dispense) | Single & Mixed SKU Product Totes, Empty Order Totes | Order Totes, Empty Totes |
| SSD (Store Storage and Dispense) | Closed System | Closed System |

A classification example that may utilize the racking systems disclosed herein may be a retail or other Distribution Center (DC). A Distribution Center (DC) may distribute goods to retail stores or Regional Distribution Centers (RDC) where the distribution center may be one or more warehouse(s) that receives pallets that may contain common cases of goods and ships "rainbow pallets" that may contain layers or mixed cases of goods for shipment to Regional Distribution Centers. The disclosed rack system may be utilized to store and ship multiple pallets or in the absence of pallets may be utilized to store and ship racks of cases.

Another classification example that may utilize the racking systems disclosed may be a Regional Distribution Centers (RDC) that distributes goods to retail stores. Here, the regional distribution center may be one or more warehouse(s) that receives pallets of common cases, rainbow pallets of mixed cases, and/or empty totes and ships single & mixed SKU Product Totes to retail stores.

Another classification example that may utilize the racking systems disclosed may be a Darkstore that distributes goods to customers. Here, the Darkstore may be one or more warehouse(s) that receives Single & Mixed SKU Product Totes or Empty Product totes and ships or dispenses Order Totes to customers or Empty Order Totes to be replenished.

Another classification example that may utilize the racking systems disclosed may be a Remote Storage Dispense facility (RSD) that distributes goods to customers. An RSD facility may be used primarily where the facility uses totes primarily for storage and dispense only. Here, the Remote Storage Dispense may be one or more location(s) that receives Order Totes and ships or dispenses Orders customers or Empty Totes to be replenished.

Another classification example that may utilize the racking systems disclosed may be a Store Picking & Storage Dispense facility (SPSD) that distributes goods to customers. Here, the Store Picking & Storage Dispense facility may be one or more location(s) that receives Single & Mixed SKU Product Totes or Empty Order Totes and ships or dispenses Order Totes to customers or Empty Totes to be replenished.

Another classification example that may utilize the racking systems disclosed may be a Store Storage and Dispense facility (SSD). Although this type of facility is a closed system, the racking system may be utilized, for example, for importing additional order totes remotely as supplemental to floor picking with order or product totes being received and empty totes shipped to be replenished.

Each of the exemplary instances above are provided as an array of possible application of the racking systems disclosed where numerous applications may be anticipated. For example, the racking system described may be used in ambient picking systems for shipping, receiving and replenishment. Similarly. The racking systems described may be used with ambient picking systems but also with chilled or frozen picking systems. Accordingly, and by way of example, anything within or downstream of a distribution center may utilize the racking systems disclosed to manage inventory for industrial or commercial product or merchandise with cases, totes, sub-totes or otherwise within a given supply chain or operation.

Figure 2:
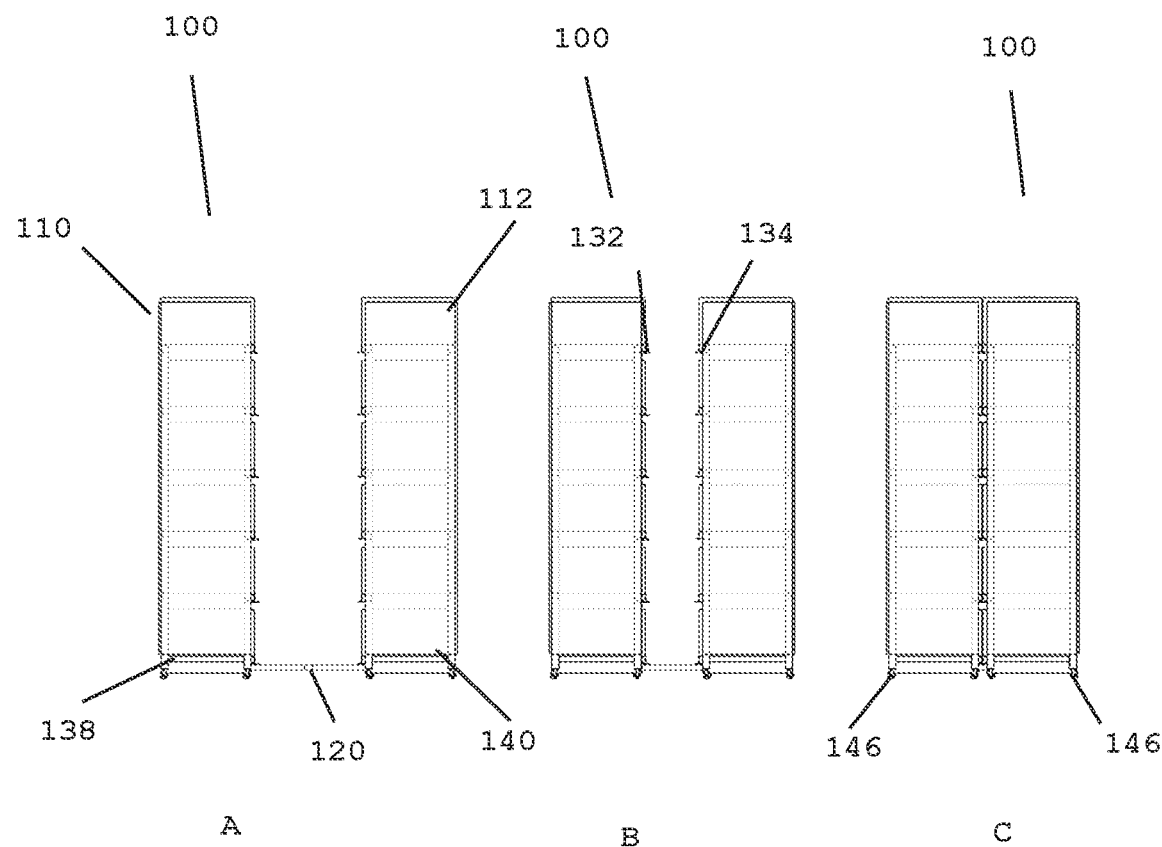
Figure 3:
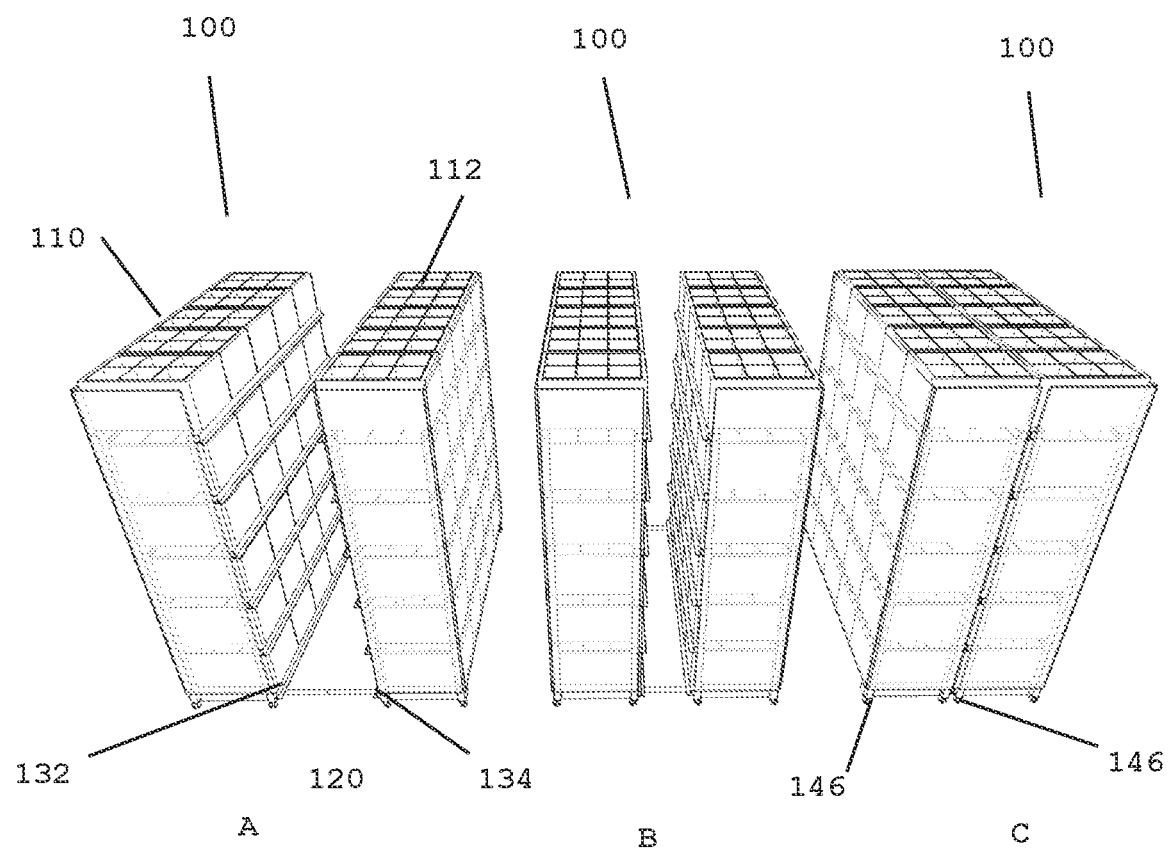

Referring now to FIG. 1, there is shown a top view of racks 100. Referring also to FIG. 2, there is shown an end view of racks 100. Referring also to FIG. 3, there is shown a perspective view of racks 100. Rack 100 is shown in three states A, B and C. The A state is an expanded state, the B state is with Rack 100 being compressed and the C state is shown with rack 100 compressed or collapsed. Rack 100 has first 110 and second 112 tote support structure holding totes 114 where totes 114 may also have sub-totes 116 for carrying goods. First 110 and second 112 tote support structures are coupled together with collapsing guide structure 120 that provides guidance between first 110 and second 112 tote support structures as they are being collapsed between the position shown in A to the position shown in C or opened from position C to the position shown in A. Tote support structures may also be referred to as "shelf structures" or "shelf modules" as opposed to "tote supports". Racks 110, 112 are shown with 5 totes in each row of totes; in alternate aspects more or less totes may be provided. When the racks 110, 112 are in the open position shown in A, there is sufficient width to support Bots in the region 128 between racks 110, 112. Racks 110, 112 are further provided with Bot supporting rails 132, 134 that both support and guide Bots between racks 110, 112 when racks 110, 112 are opened as seen in A allowing Bots to access (store/retrieve) totes in racks 110, 112. As seen in FIG. 2, vertical supports 138, 140 may be provided in racks 110, 112 supporting six rows of totes each respectively. In the embodiment shown, six rows each are shown but in alternate aspects, more or less rows may be provided. Casters 146 may be provided to support racks 110, 112 and allow racks 110, 112 to be freely moved around on a surface, for example on a surface that allows racks 110, 112 to be coupled to a structure that allows Bots to access racks 110, 112, on a surface that may be a loading dock for trucks, containers or otherwise, or on a surface that is in the interior of a truck box or container where racks 110, 112 couple to the interior of the truck box or container for transport or shipment to another facility, for example, retail facility, distribution center or otherwise as described. Casters 146 may be conventional rotating and locking casters or simply conventional casters; in alternate aspects, casters 146 may be spherical wheels to make the heavy rack easier to maneuver into position.

With respect to the afore-mentioned racks, collapsing guide structure 120 may have friction drives, for example, screw or gear drive with either vee wheels on angle iron rails or ball transfers running on vee grooves or small channels for the lateral motion. Alternately, the two frames could be connected via slides, telescoping tubes or otherwise. The racks may be coupled by friction. Latches or otherwise to each other or mating structure(s) such as rack structure, truck boxes or otherwise. For example, pins and sockets may be provided that guides the rack into mating structure where the pins could have ball locks. In alternate aspects, any suitable docking mechanism may be provided. As will be described, moving the racks may be manual or motorized with a trolley or mating device or with powered motor(s) individually within each rack with self-contained or remote power. As the totes come together when collapsing the rack, the totes themselves may retain each other. Alternately, cams could be activated to push tote locks up so the totes are retained during transit. Stops may be provided on the rear of the tote guides to prevent removal at any time. Docking features may guide the racks into opposition as necessary and may utilize locks like ball locks or cam style locks that would automatically drop into place when properly docked; depending on the rollers/moving scheme they could drop into features on the floor or rails that would positively locate them. Racks may Roll slide in from the side on guides in/on the floor. When docking the truck there could be guides that funnel the wheels into a prescribed track that allows the module to be rolled into position and locked into place. When the racks slide in and out of position, an automatic restraint may be provided that may would pop out on the adjacent structure rails to stop Bots from driving into the void and falling. When the shelf is inserted the restraint(s) would retract, allowing the robot to roll on the rails of the shelf. Here, the robot rail could stay in place in the structure and there may be a front tote rail on the cart to support the inboard side of the tote when the rack shelves/cart are removed.

The rack may be collapsed utilizing a manual or motorized screw to manually open or collapse/close the rack. Alternately, a PTO (power take off) on the tugger may actuate the drive to collapse the rack structure. Alternately, a separate AMR may push the rack closed or pull the rack open. Alternately, a motor on the rack itself may be provided to close and collapse the rack while an operator moves it. The rack may be held closed or collapsed by a screw that does not back-drive in combination with a guide, for example, tongue and groove or otherwise to prevent racking of the structure. The rails the bots run on are the tongue, and the top of the "groove" rail. These two rails may be offset by approximately 4 mm in height, but the bot can handle this offset. Being able to interlock the rails together, and the draft of the tote is almost the length of the tongue enables the totes to come together and retain the opposite tote. When the rails are brought together, a clearance between totes, for example, 3 mm or otherwise may be provided to prevent tote movement. Totes may be retained in tote nests on three sides in combination with an outer fence to prevent hands from accessing them for safety. The truck may be provided with guides or curbs inside the box to prevent lateral movement. Floor based latches and clamping may be provided in the box base or floor to secure the load.

Figure 4:
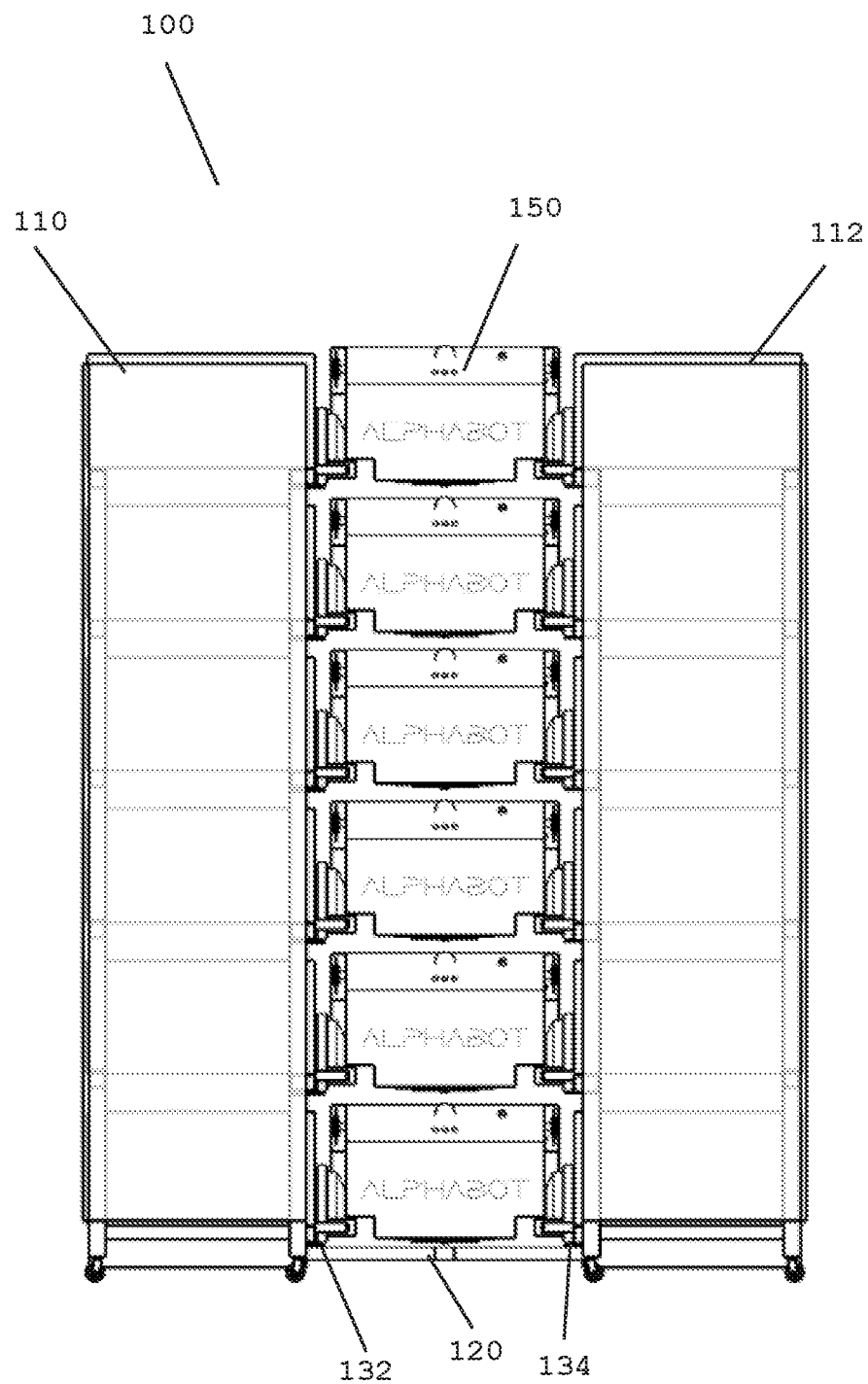
FIGS. 4-6 are end, perspective and top views of racks according to the present technology with mobile robots (BOTS).
Figure 5:
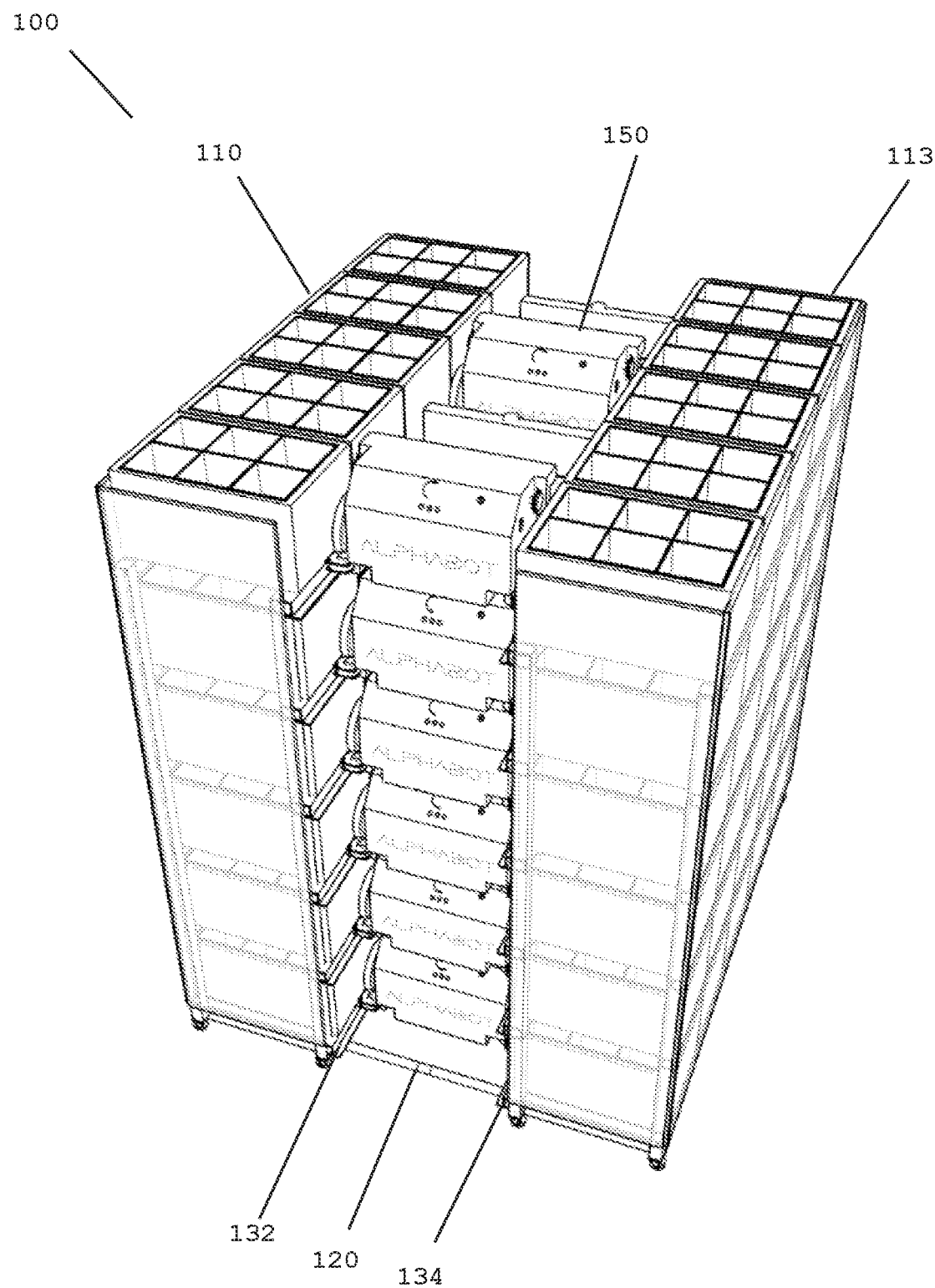
Figure 6:
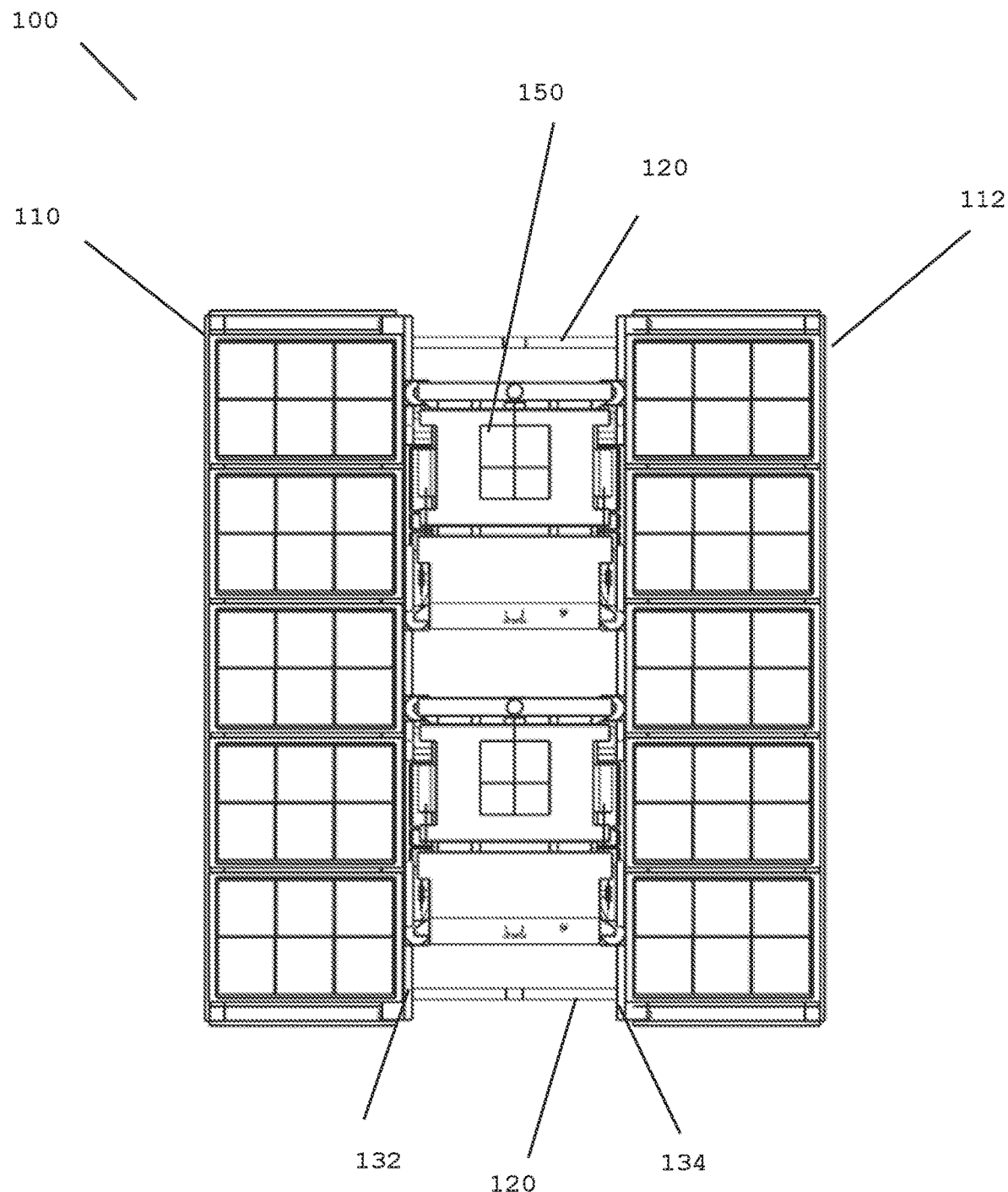

Referring now to FIG. 4, there is shown an end view of racks 100 with Bots 150. Referring also to FIG. 5, there is shown an isometric view of racks 100 with Bots 150. Referring also to FIG. 6, there is shown a top view of racks 100 with Bots 150. Bots 150 are shown supported on rails 132, 134 where 12 Bots may be supported on the rack structure shown in FIGS. 1-3 in the A expanded position. In alternate aspects, more or less Bots may be supported and provided. Where rack 100 is retained in the open position with Bots supported as shown, the rack structure 100 may be shipped as shown, for example, to both replenish inventory from the totes contained therein and also to add Bot capacity to a given installation, for example, during periods of higher demand such as during holiday seasons.

The figures and considerations that follow represent non-limiting examples of configurations in which rack(s) 100 may be used.

There are multiple ways to orient the racks in the box of a truck or container and opening of the box of a truck or container. One example is width-wise insertion where, for example, 5-tote rack lengths may be provided. Alternately, it is possible to provide a box and door opening to allow four lengthwise rack insertion with four rack modules across. Here, lengthwise insertion may provide the following: First is load density, which drives transport costs. For example, a 12% higher load density for lengthwise (336 totes) vs widthwise (300 totes) may be provided with a similar box length. Here, each rack may be 30 totes, where the last one may be inserted sideways. Here, 330 totes may be provided (10% more), or alternately 360 (20% more) may be provided by extending the truck box. Second, multiple Transport Rack Cartridges (TRC's) load sizes may be supported with only the length of the modules (and boxes) varying, so the tower-fixtures at each terminus may be the same configuration as will be shown. In addition, layouts may be provided where connections may be provided underneath storage, where the connection doesn't necessarily have to be at the end of an aisle. By way of example, a 5 wide rack structure may be provided in a 6 wide configuration as it allows bollards that prevent the TRC from hitting structural uprights. Here, more towers may be provided in the bay to facilitate throughput where only the floorspace allocated for the expanded TRC footprint would change, which may apply regardless of orientation. With width-wise insertion, variable load sizes may mean varying the number of modules, so the tower fixtures may vary depending on the load size used for a given system, unless all were configured for maximum load, which may be shown, for example, as ten towers/aisle. With length-wise insertion, by contrast, all tower fixtures may only have four towers/aisles, regardless of load size. Here, if the same truck size is utilized for all replenishment loads, there would be many fewer towers/aisles at each terminus; 4 vs 10 for example.

Another consideration may be the need for refrigeration for transporting chilled and frozen goods, which may require insulated walls in the truck box impacting lengthwise insertion perhaps more than widthwise insertion. By way of example, a 5' long rack may be a good starting point that provides flexibility for refrigerated side loading.

Another consideration may be where the retail or facility operator may provide trucks specifically configured for the racking system disclosed and may require a customized box developed and built at reasonable cost. Alternately a standard opening and/or standard box may be provided and adapted to the application. By way of example, a 102" DOT width limit box may be provided with 4" per side allocated to door hinge and/or door vertical track capability. This would allocate the rack space of approximately 93" or so max for the actual door opening. Once the rack exits through the door, the ability to shunt may be provided. By way of example, the racking structure may be adapted based on the truck size where truck width in combination with door opening work may provide an additional 20% totes, for example, with a 2' longer box truck.

The horizontal dimension from the fronts of the totes relative to the bot rail vertical surfaces may be set 1 mm back, such that when the rails are compressed with the rails together the totes are retained with 2 mm nominal clearance. Alternately, the horizontal Bot wheel riding surfaces may interleave providing benefits such as to reinforce the strength of the rack in a passive manner. Alternately, the Bot support rails may be configured as a hinged rail where the totes may be retained by neighboring totes when the racks are abutted together.

Another consideration is truck loading. For example, with an example maximum outer width being 102" and inner width of 98", door width maximum may typically be 93". Considering an example six totes with 15 mm gap between all (eliminating the wider flue gap between outer sets of 3). The width is 97.5" not including supporting structure, such as rack end posts. With the truck constraints, putting 6 wide in the box may be unlikely, even with a custom truck. Alternately, 5 totes wide with rack end posts ends up around 86" wide which would leave 3" per side going through typ. 92" door, but leaves 6" per side inside the truck. Here, the most common box may have length 20-26' for box trucks have a 92" interior width, at which the 5 wide provides clearance. Alternately, the racks may be inserted lengthwise. Here, a width of 4 rows of totes (ex: 600 mm dimension each) and back shields brings the dimension to 98".

Another consideration is whether system towers or rails the racks mate to are movably deployable or always immediate to the dock. Requiring them to be local to the dock may put a constraint on the system, or alternately requiring at a least transit rail Bot interface at dock locations may be a difficult constraining in store retrofits. One possible approach is the use of a tugger (AMR or otherwise) to move the rack modules where it is possible to locate the tower fixture closer to the picking system and roll the racks between fixture and loading docks. Loading and unloading the TRCs at the loading dock is practical where a number of Alphabot bots shuttling between the system and the fixture may outweigh requiring the labor to move the TRCs through the workspace. Staging space is provided at the loading dock where the system utilizes the space as intended. Here and to improve cycle time between truck loading and unloading cycles, the entire set of rack modules (multiple racks 100) may be tied together and transported/loaded/unloaded as a single unit, as opposed to individual pairs (Racks 110, 112).

Another consideration is weight. By way of non-limiting example, if 30 totes are provided (6 rows, 5 totes each row) per rack, weight may be 1500 lb per rack if fully loaded at 50 lbs each tote or roughly 15,000 lbs total. If cargo capacity of a 20' box truck may be 5,700 lbs then the average weight per tote is limited to approximately 19 lbs each if the truck is filled with racks. Alternately, if a 26' box truck can transport 9,600 lbs then the average weight per tote is limited to approximately 24 lbs each. Accordingly, various rack sizes and combinations may be provided to optimize average tote or payload weight in combination with the associated rack weight as applied to truck size, box dimensions, deck height and length, volume and gross vehicle weight, for example, as applied to truck dimensions and parameters as shown in table 2:

TABLE 2

| | | | | | | |
|---|---|---|---|---|---|---|
| Equivalent Truck Sizes | 6', 7', 8' | 7', 8', 9' | 9', 10' | 11', 12', 13', 14', 15' | 16', 17', 18', 19', 20' | 21', 22', 23', 24', 25', 26' |
| Interior Length, Width, Height | 7'10" × 5'2" × 1'9" | 9'6" × 5'7" × 4'8" | 9'11" × 6'4" × 6'2" | 15' × 7'8" × 7'2" | 19'6" × 7'8" × 7'2" | 26'2" × 8'2" × 8'3" |

TABLE 2-continued

| Deck Height From Ground | 3' | 2'5" | 2'5" | 2'10" | 2'11" | 2'11" |
|---|---|---|---|---|---|---|
| Deck Length | 7'10" | 9'6" | 9'11" | 12'5" | 16'10" | 23'5" |
| Volume | Open Bed | 245 cu. ft. | 402 cu. ft. | 764 cu. ft. | 1,016 cu. ft. | 1,682 cu. ft. |
| Gross Vehicle Weight | 6,700 lbs. max | 9,000 lbs. max | 8,600 lbs. max | 14,500 lbs. max | 14,500 lbs. max | 25,999 lbs. max |

Figure 7:
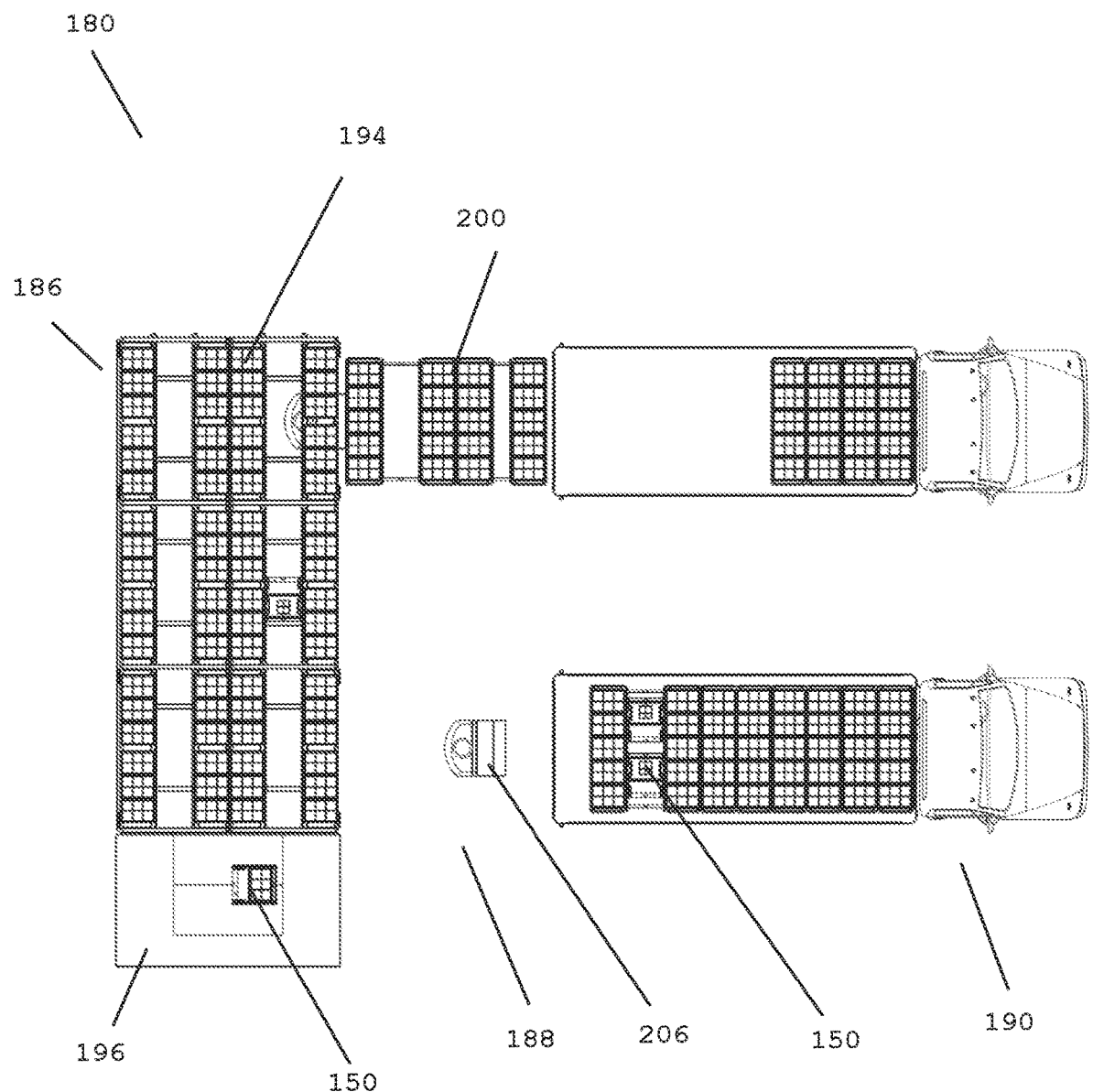
FIGS. 7-10 are top, side and perspective views of a system for transfer of racks according to the present technology into shipping truck boxes.
Figure 8:
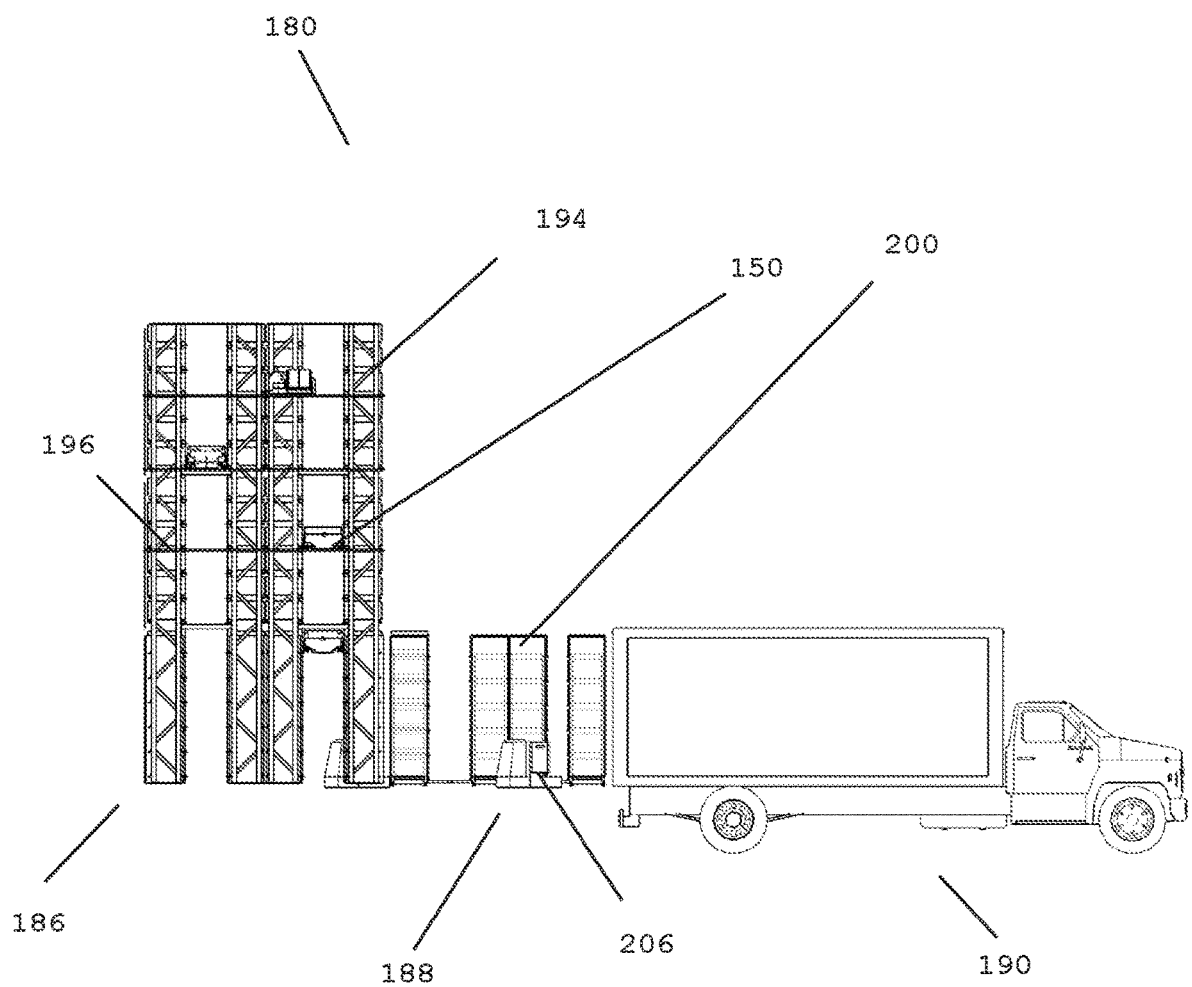
Figure 9:
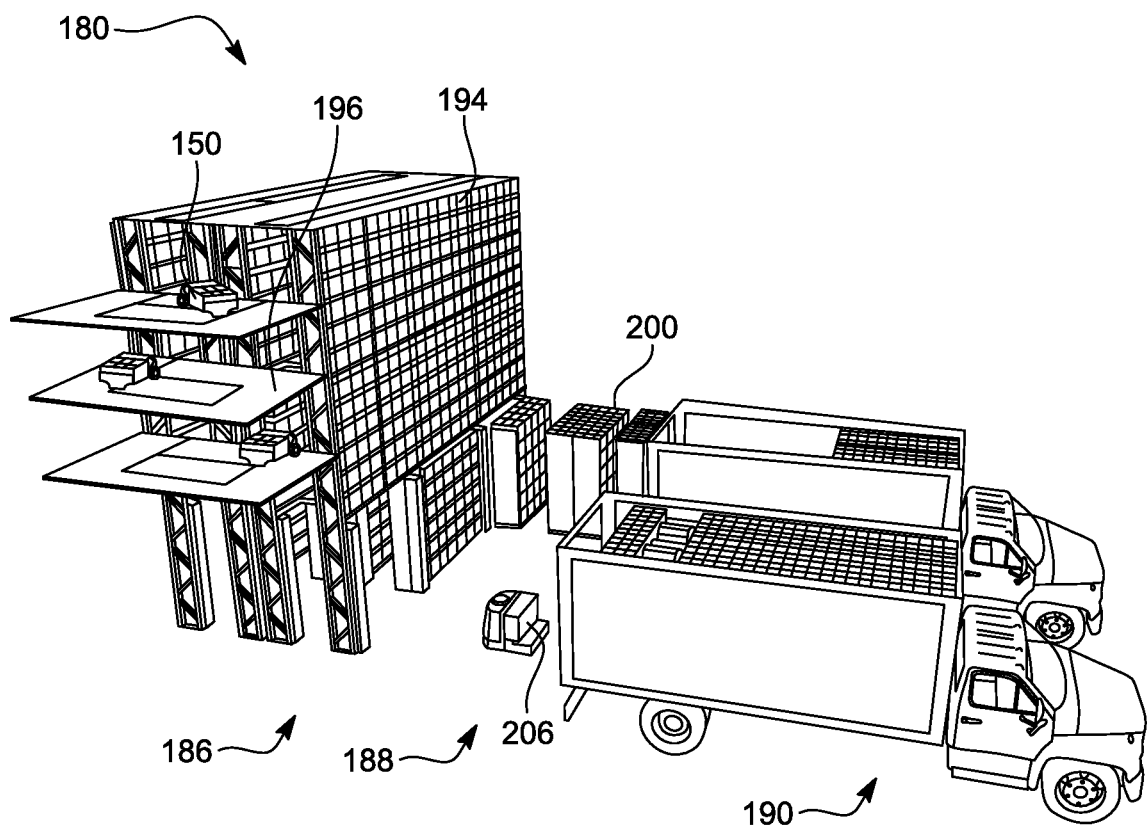
Figure 10:
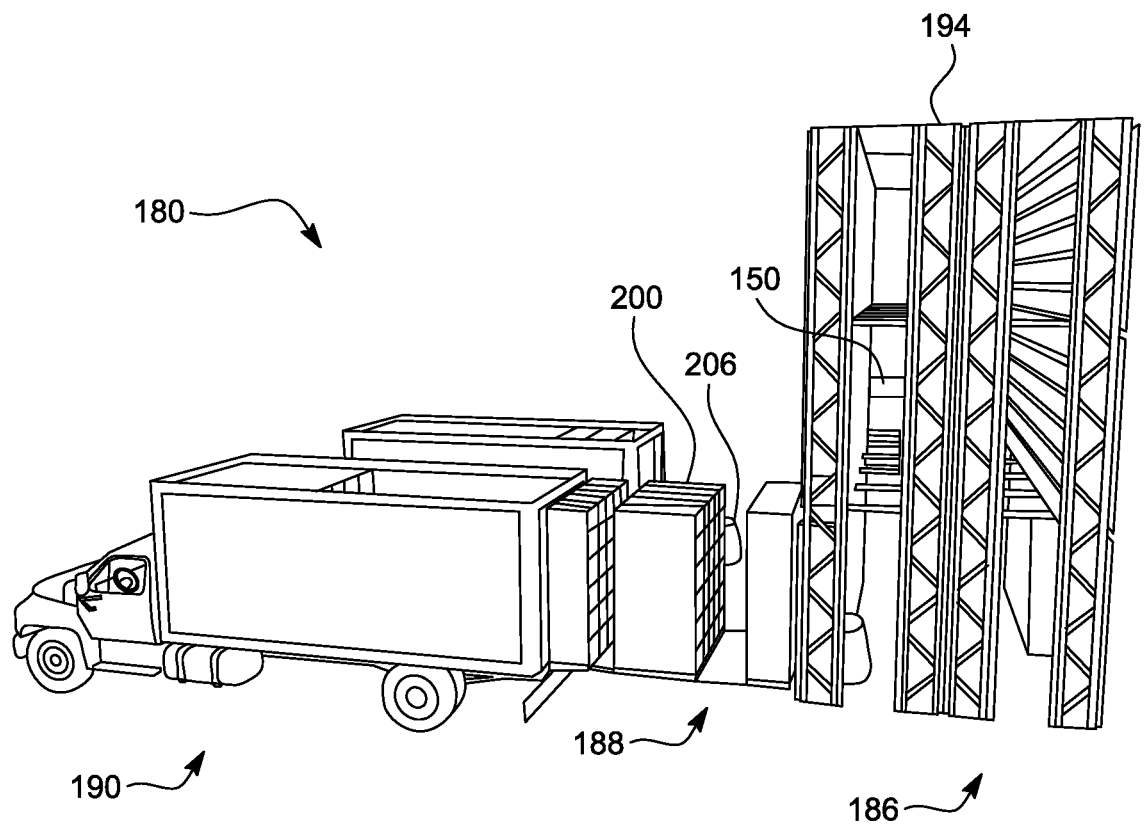

Referring now to FIG. 7 there is shown a top view of exemplary system 180 that utilizes widthwise insertion into shipping truck boxes and widthwise insertion and extraction from a storage structure. Referring also to FIG. 8 there is shown a side view of exemplary system 180. Referring also to FIGS. 9 and 10 there are shown perspective views of exemplary system 180. System 180 has storage structure 186, dock staging area 188 and trucks 190. Storage structure 186 has racks 194 that may have rails and verticals to allow Bots 150 to traverse along the aisles on the support rails or from aisle to aisle vertically (level to level). Storage structure 186 has transit decks 196 that allow Bots to move horizontally from aisle to aisle. Collapsible rack 200 is shown being removed from or inserted into rack structure 186 widthwise where collapsible rack 200 may be made up of two racks 100 or may be where they are combined in a single collapsible rack with four tote supporting structures that collapse as shown. Alternately, more or less racks may be provided in a collapsible configuration. An automated motorized robot (AMR) 206 may be utilized to transport racks 200 to and from the storage structure where automated motorized robot (AMR) 206 may be an automated robot that acts autonomously. Alternately, automated motorized robot (AMR) 206 may be a human operated power assisted transport drive, and automated guided vehicle, automated forktruck or other suitable drive adapted to transport racks 200 from destination to destination. Alternately, racks 200 may be manually transported where no automated motorized robot (AMR) 206 would be provided. In the embodiment shown, racks 200 are collapsed and inserted into trucks 190 widthwise. Alternately, racks 200 may be partially collapsed, for example, where Bots 150 are intended to be transported as shown. In the embodiment shown, racks 200 may be shunted or moved linearly directly to/from the rack structure 186 and from/to trucks 190.

Figure 11:
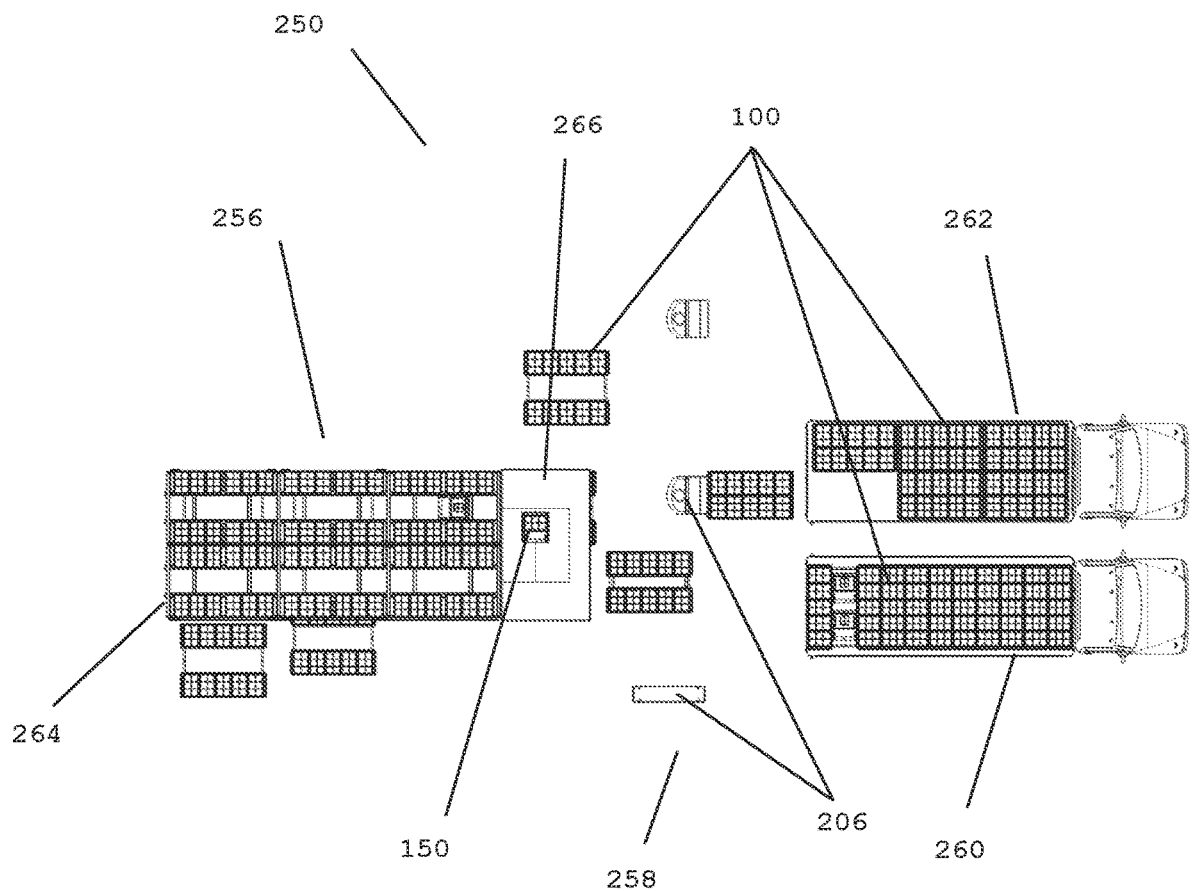
FIGS. 11-14 are top, side and perspective views of a system for transfer of racks according to the present technology into shipping truck boxes.
Figure 12:
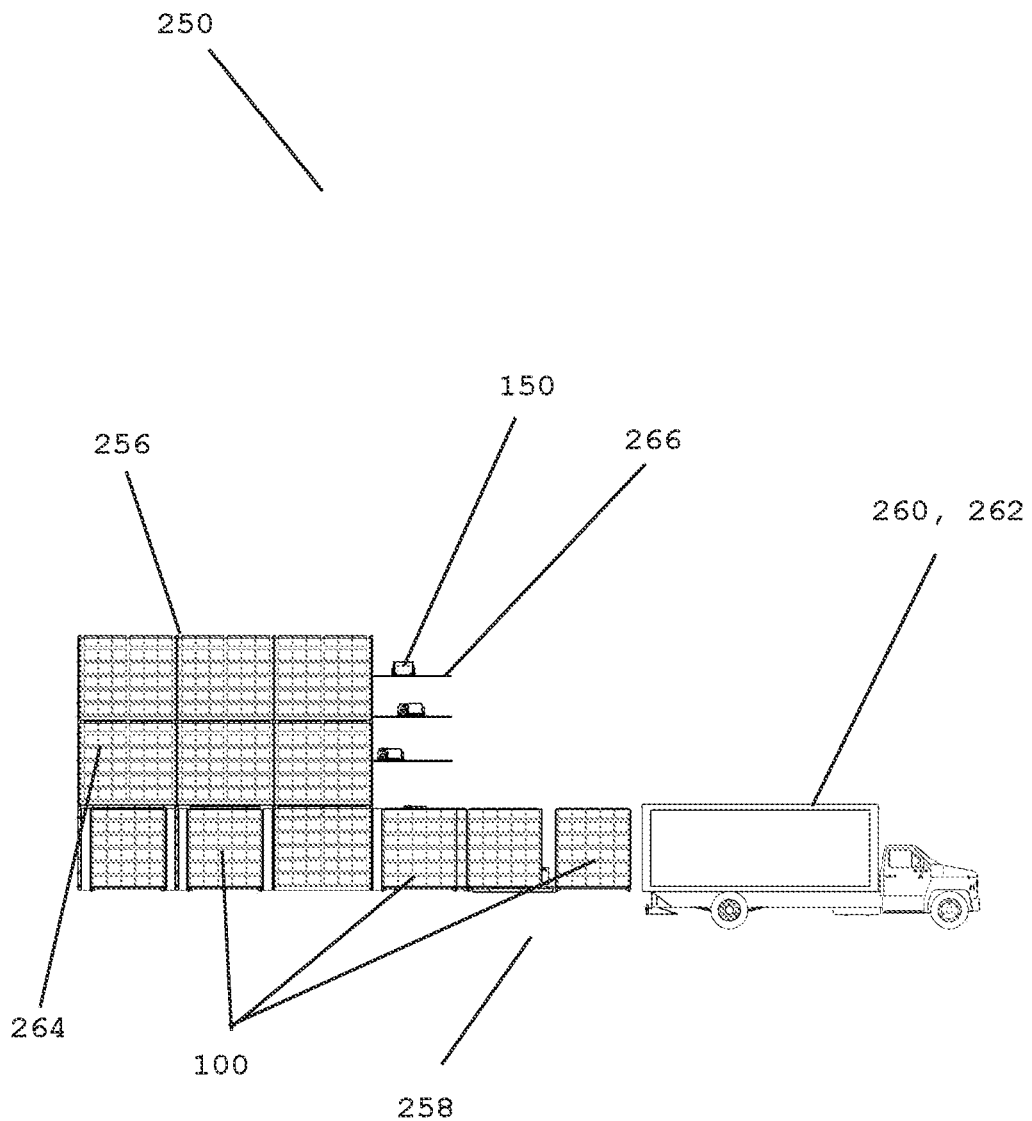
Figure 13:
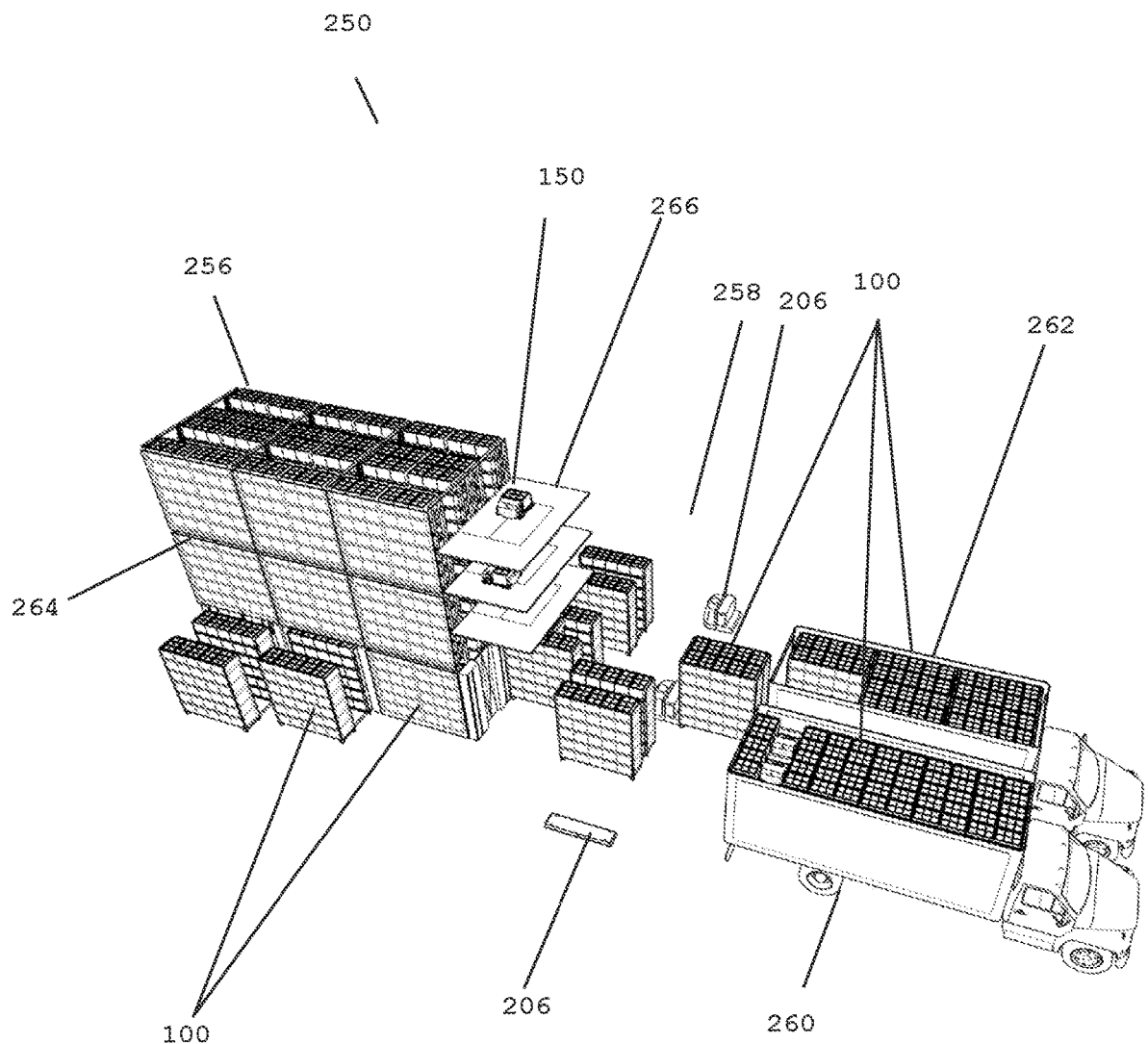
Figure 14:
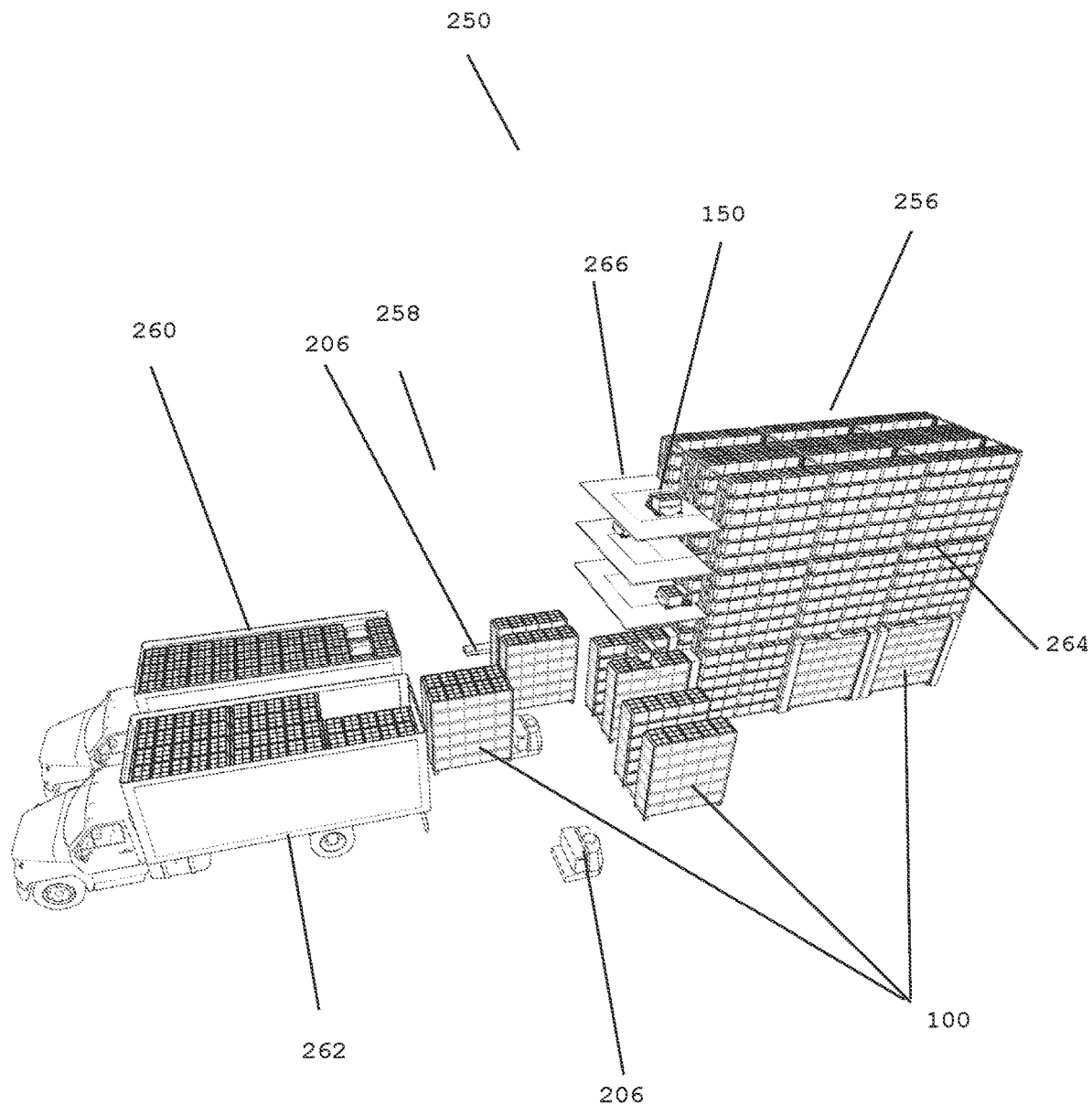

Referring now to FIG. 11 there is shown a top view of exemplary system 250 that utilizes width wise insertion and extraction from a storage structure and both width wise and length wise insertion and extraction from shipping truck boxes. Referring also to FIG. 12 there is shown a side view of exemplary system 250. Referring also to FIGS. 13 and 14 there are shown perspective views of exemplary system 250. System 250 has storage structure 256, dock staging area 258 and trucks 260, 262. Storage structure 256 has racks 264 that may have rails and verticals to allow Bots 150 to traverse along the aisles on the support rails or from aisle to aisle vertically (level to level). Storage structure 256 has transit decks 266 that allow Bots to move horizontally from aisle to aisle. Collapsible rack 100 is shown being removed from or inserted into rack structure 186 widthwise. Alternately, collapsible rack 100 may be made up of two racks or more racks where they are combined in a single collapsible rack with more than two tote supporting structures that collapse as shown. Collapsible rack 100 is shown being removed from or inserted into truck 260 widthwise and truck 262 lengthwise. Alternately, a combination of lengthwise and widthwise racks may be provided in a collapsible, collapsed or open/un-collapsed configuration. An automated motorized robot (AMR) 206 may be utilized to transport racks 200 to and from the storage structure where automated motorized robot (AMR) 206 may be an automated robot that acts autonomously. Alternately, automated motorized robot (AMR) 206 may be a human operated power assisted transport drive, and automated guided vehicle, automated fork truck or other suitable drive adapted to transport racks 100 from destination to destination. Alternately, racks 100 may be manually transported where no automated motorized robot (AMR) 206 would be provided. In the embodiment shown, racks 100 are collapsed and inserted into truck 260 widthwise and truck 262 lengthwise. Alternately, racks 100 may be partially collapsed, for example, where Bots 150 are intended to be transported as shown. In the embodiment shown, racks 100 may be shunted widthwise or moved linearly directly to/from the rack structure 256 and then transported lengthwise as shown or widthwise from/to trucks 262, 260.

Figure 15:
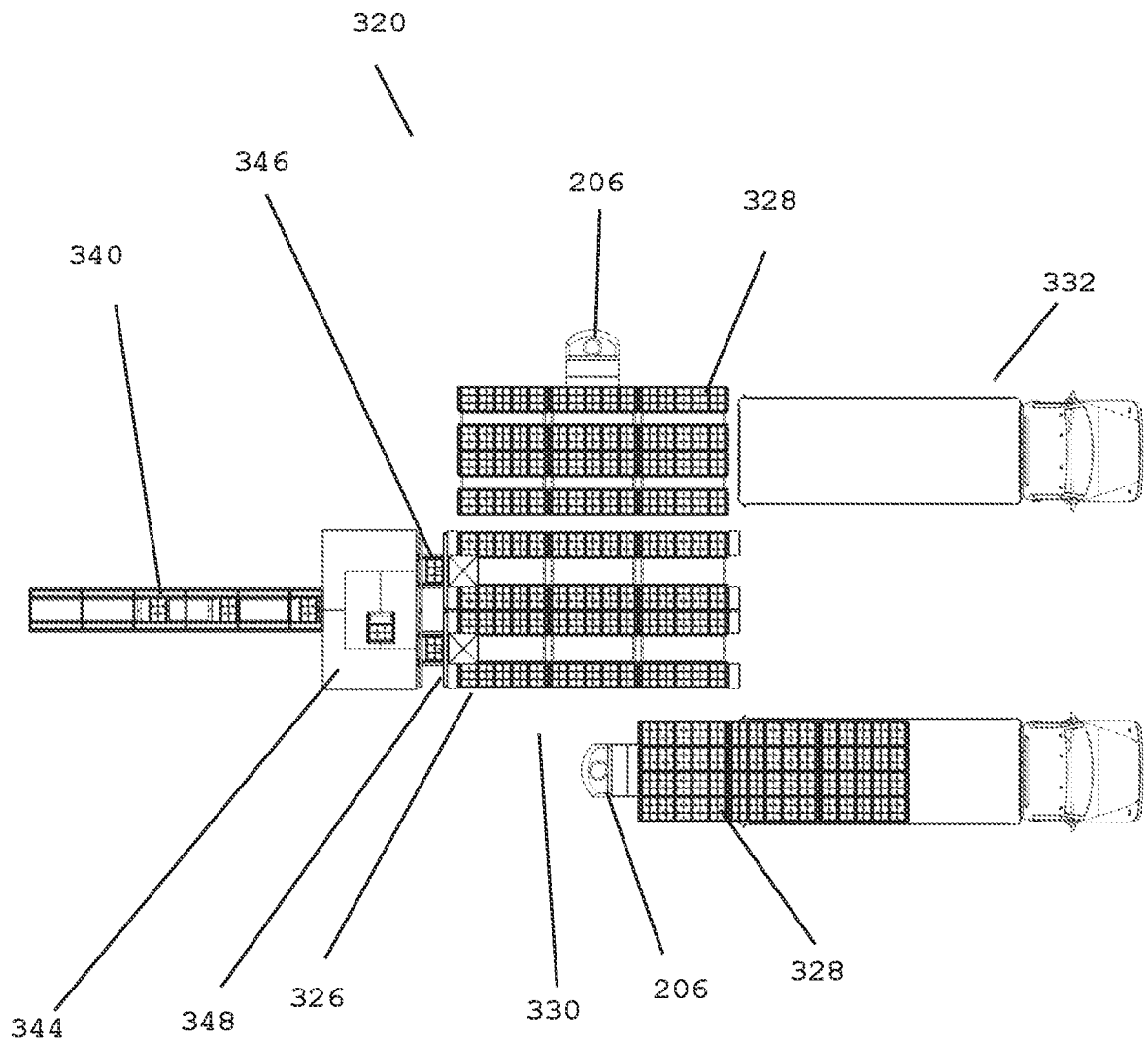
FIGS. 15-18 are top, side and perspective views of a system for transfer of racks according to the present technology into shipping truck boxes.
Figure 16:
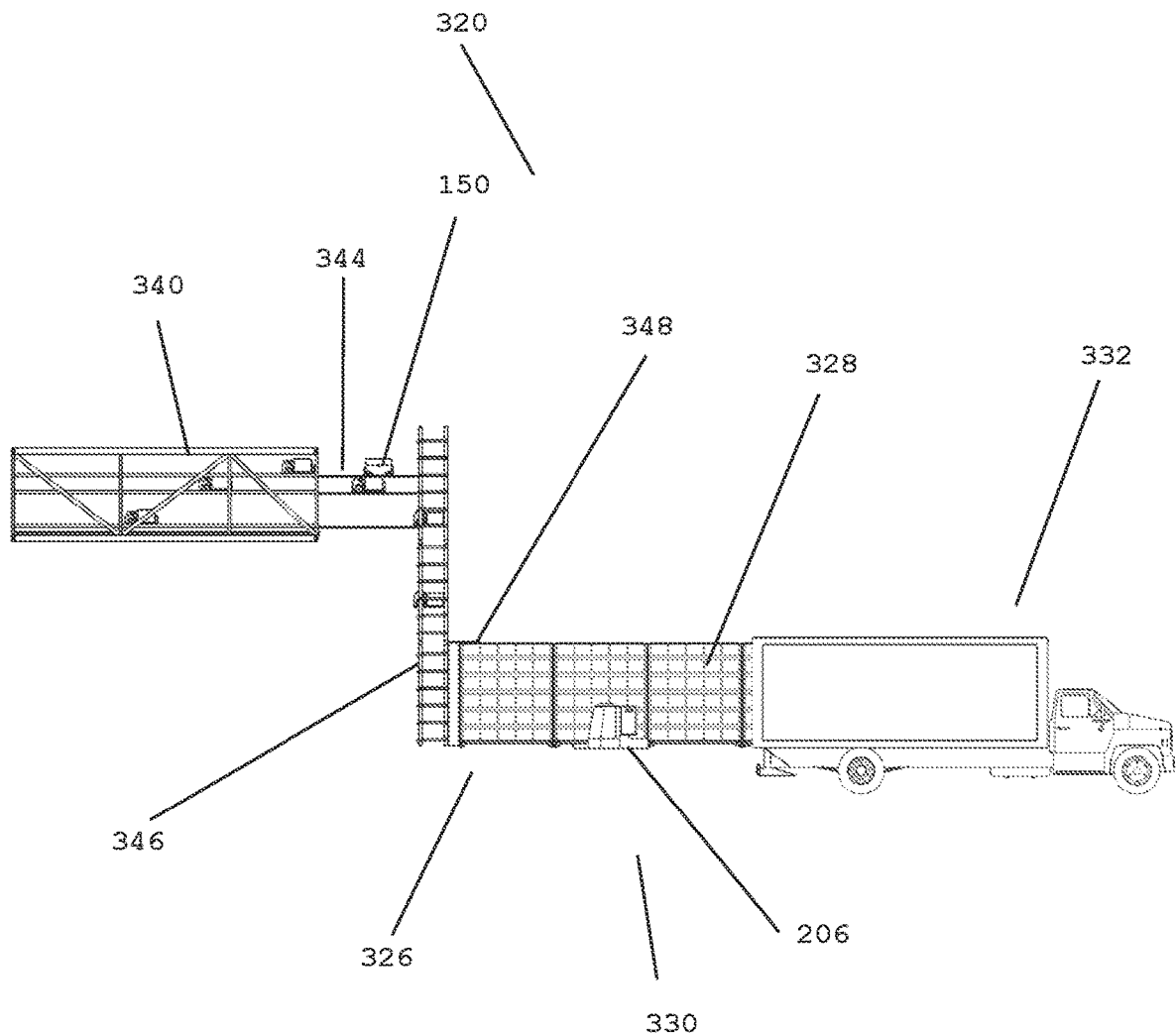
Figure 17:
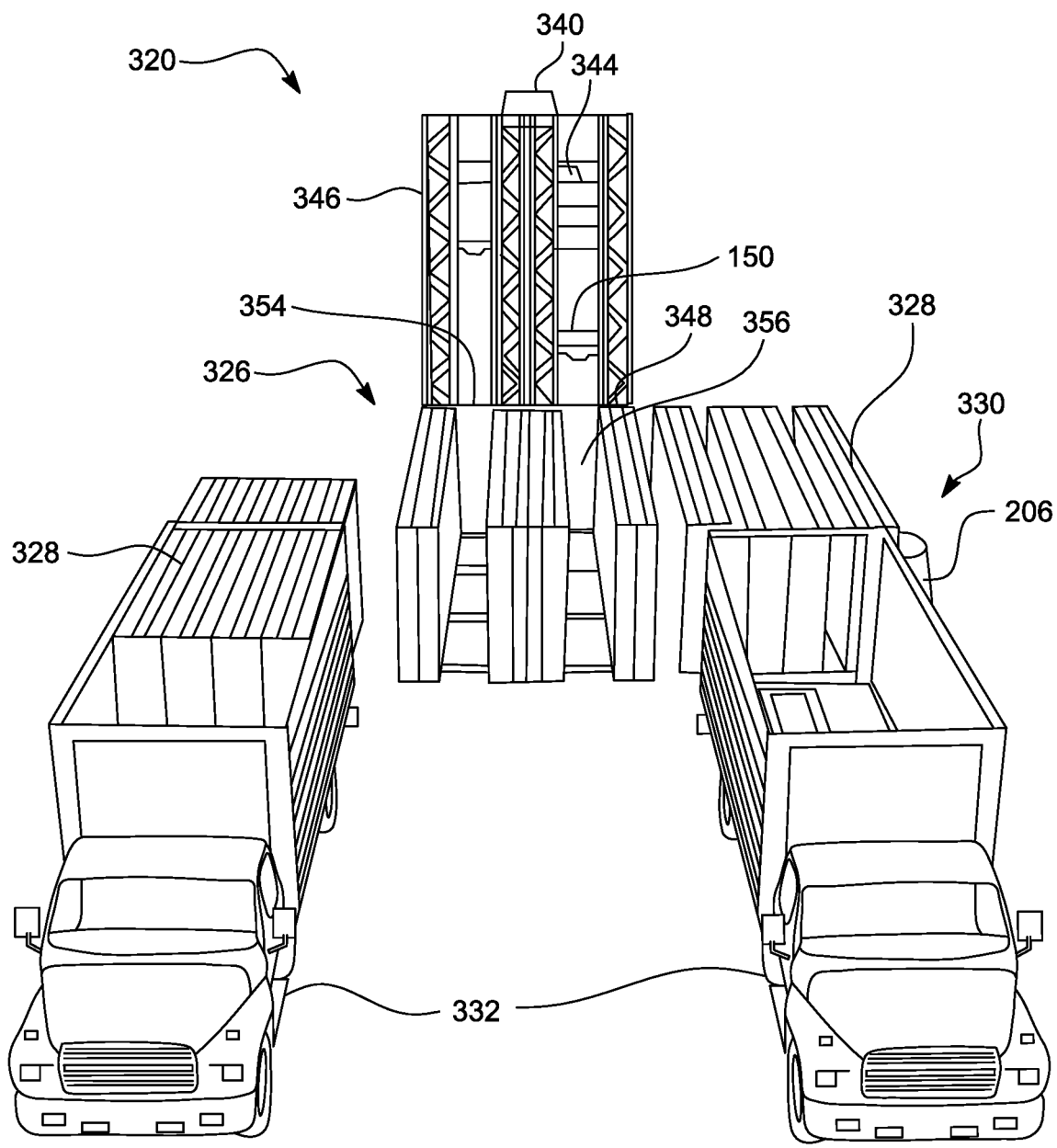
Figure 18:
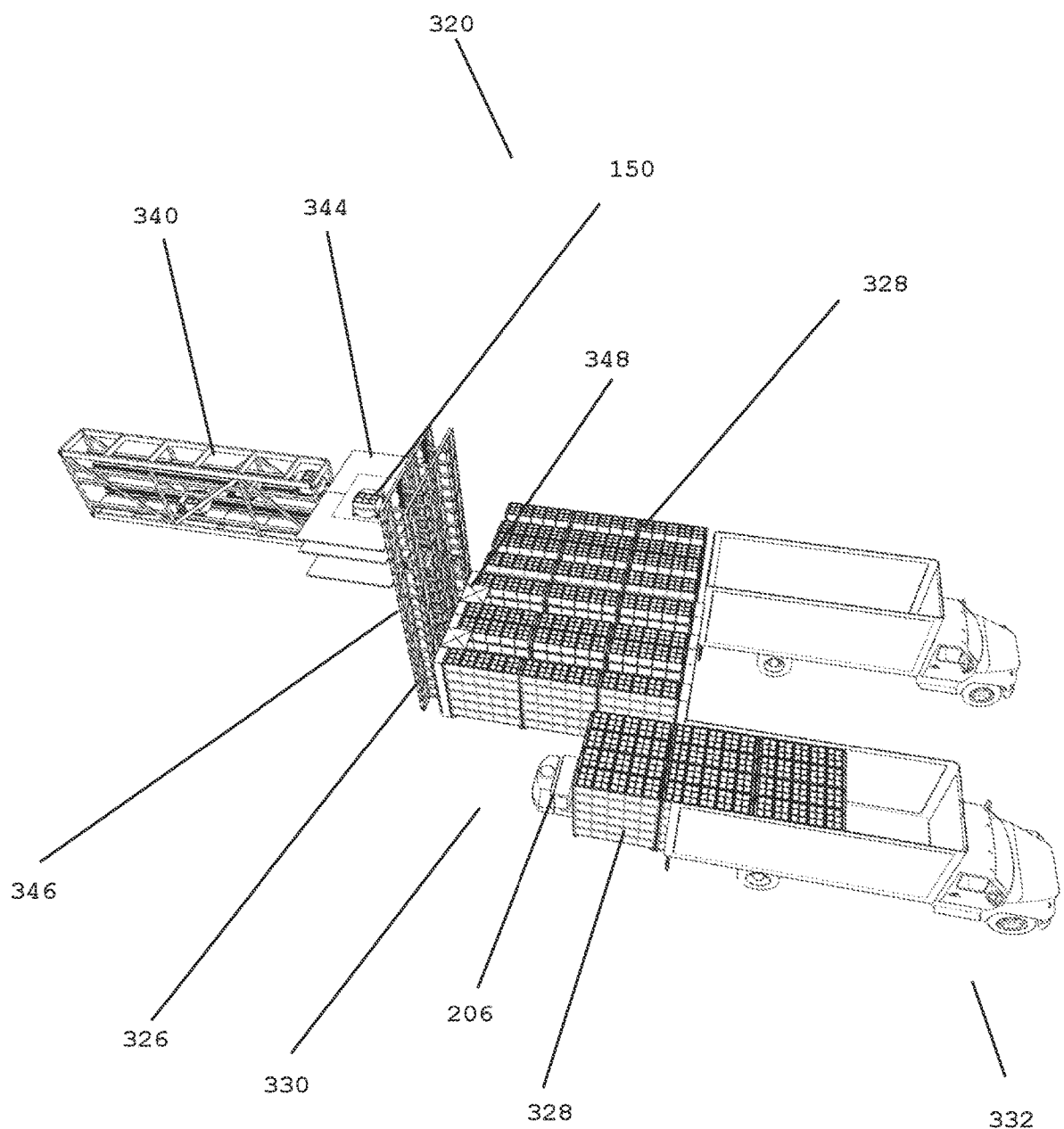

Referring now to FIG. 15 there is shown a top view of exemplary system 320 that utilizes widthwise insertion and extraction from a rack docking structure and length wise insertion and extraction from shipping truck boxes. Referring also to FIG. 16 there is shown a side view of exemplary system 320. Referring also to FIGS. 17 and 18 there are shown perspective views of exemplary system 320. System 320 has rack docking module 326, collapsible rack(s) 328, dock area 330 and trucks 332. Rack docking module may be stationary with respect to dock area 330 or may alternately be modular and moveable from docking area to docking area. In the embodiment shown, collapsible rack structure 328 is shown having 2 Bot aisles with 4 collapsible racks, 2 on each side of each aisle. Each rack is 3×5=15 totes deep and 6 totes high each. Collapsible rack structure 328 may be extracted from or inserted into rack docking module 326 by automated motorized robot (AMR) 206 widthwise. Similarly, collapsible rack structure 328 may be extracted from or inserted into the boxes of truck(s) 332 by automated motorized robot (AMR) 206 lengthwise. In the embodiment shown, collapsible rack structure 328 is collapsible or expanded as a unit and transportable as a unit such that a truck or the docking structure can quickly have a rack structure removed and replaced minimizing the time required for a truck to be at a given dock or the time a docking module is idle (not loading or unloading totes within a docked rack structure). Each dock may have some structure 340 with Bot supporting rails that enables bots to access docking module 326. Alternately, structure 340 may be part of docking module 326. In the embodiment shown, structure 340 has multiple Bot supporting rails allowing Bots to travel in opposing or different directions simultaneously to facilitate efficient loading and unloading of collapsible rack structure 328 docked to docking module 328. Docking module has transit decks 344, vertical tower 346 and docking interface structure 348. Transit decks 344 allow Bots 150 to access either of two vertical racks of tower 346 that correspond to the two aisles of rack 328. Docking interface structure 348 is provided for rack 328 to physically position and fasten to docking module 326 and may include safety blocking gates that may be provided to prevent Bots from accessing rack 328 from a vertical or horizontal direction respectively. Safety Bot blocking may be provided where a sliding Bot blocking structure may block Bot access when a rack is removed (actively driven or slaved off of the rack) and opened when a rack is inserted. These blocking mechanisms may be horizontal, vertical or otherwise. Alternately, separately actuated blocking devices may be used in combination with interlocks such that access may be prevented unless a rack structure is present.

Figure 19:
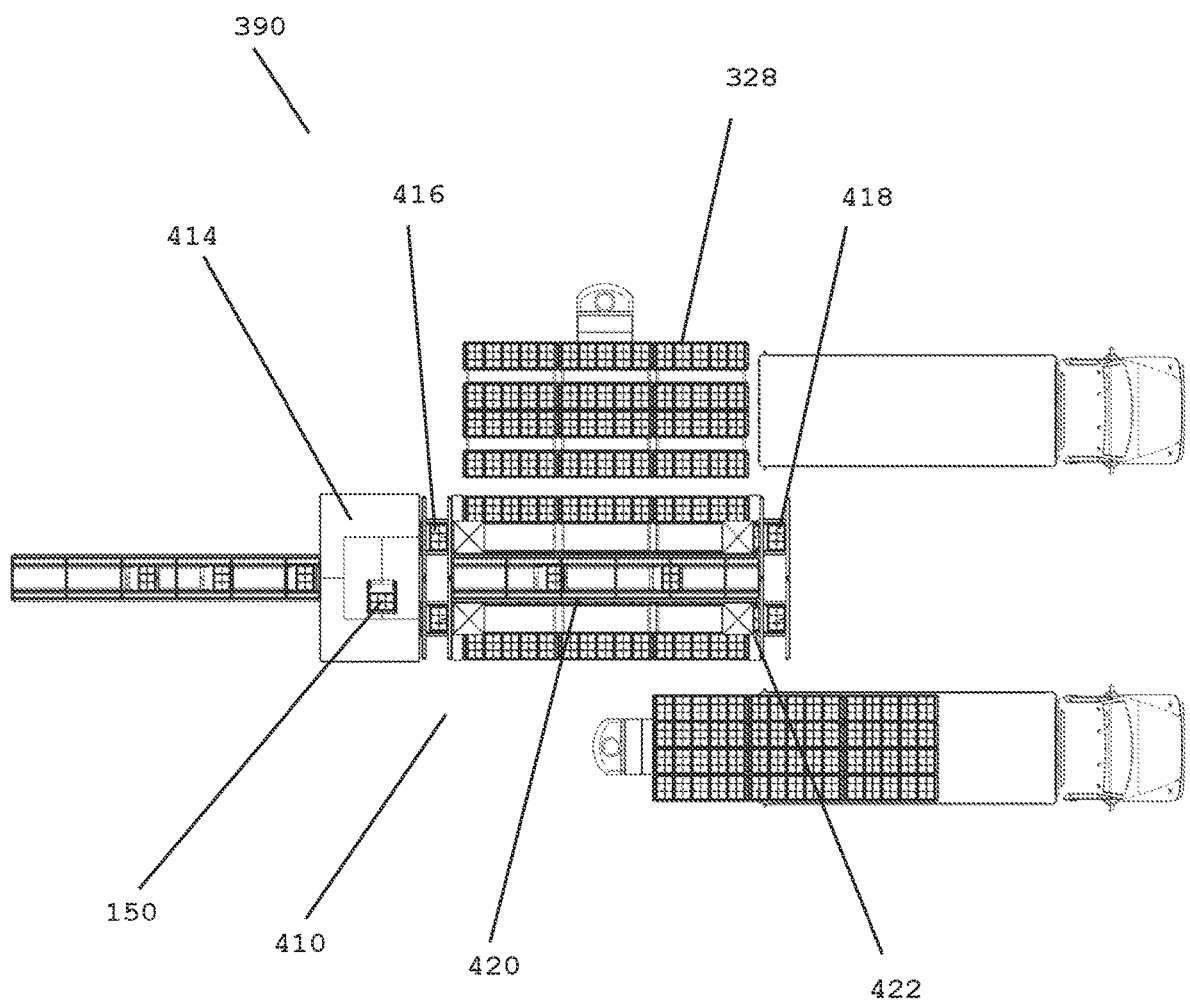
FIGS. 19-22 are top, side and perspective views of a system for transfer of racks according to the present technology into shipping truck boxes.
Figure 20:
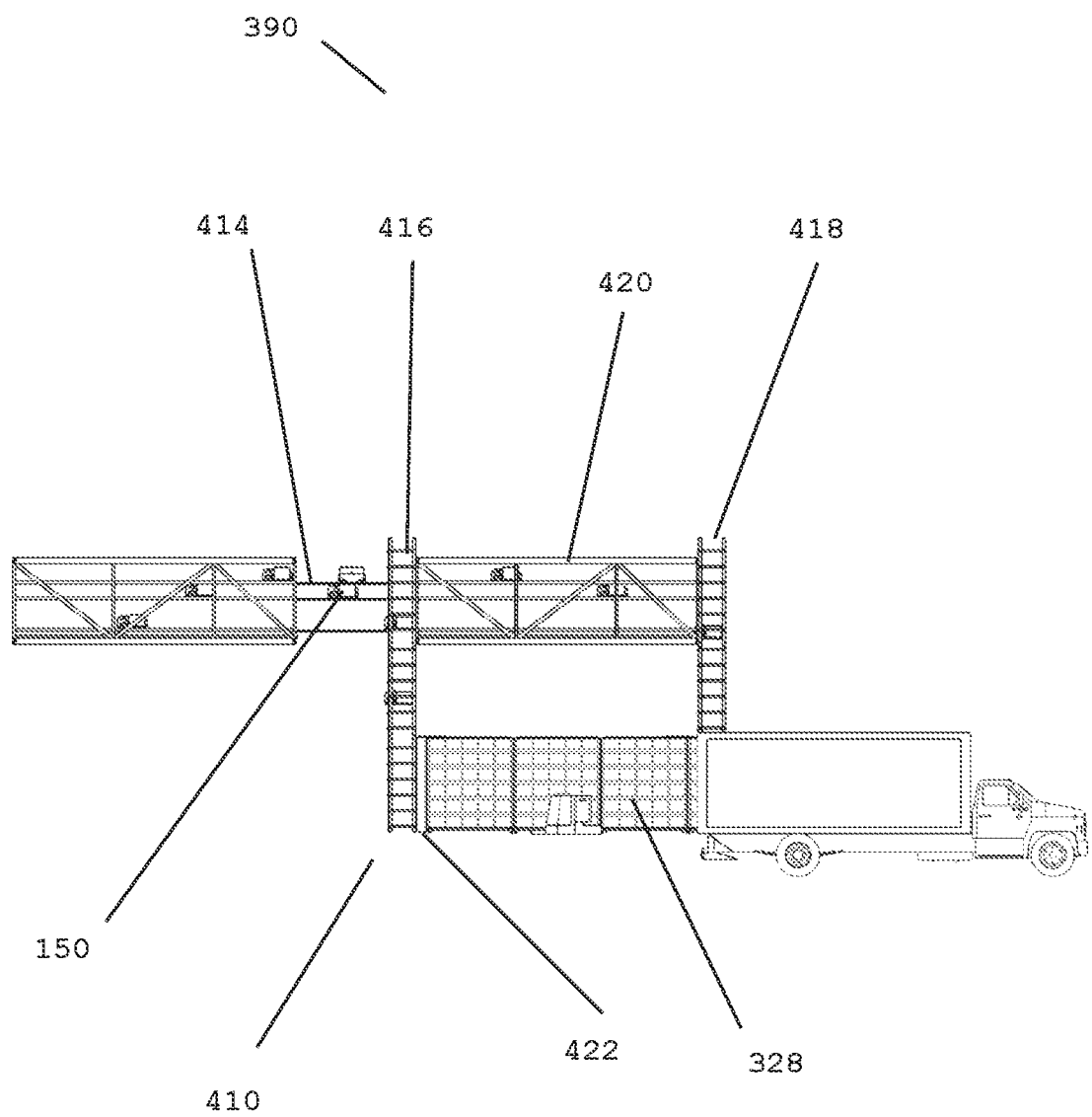
Figure 21:
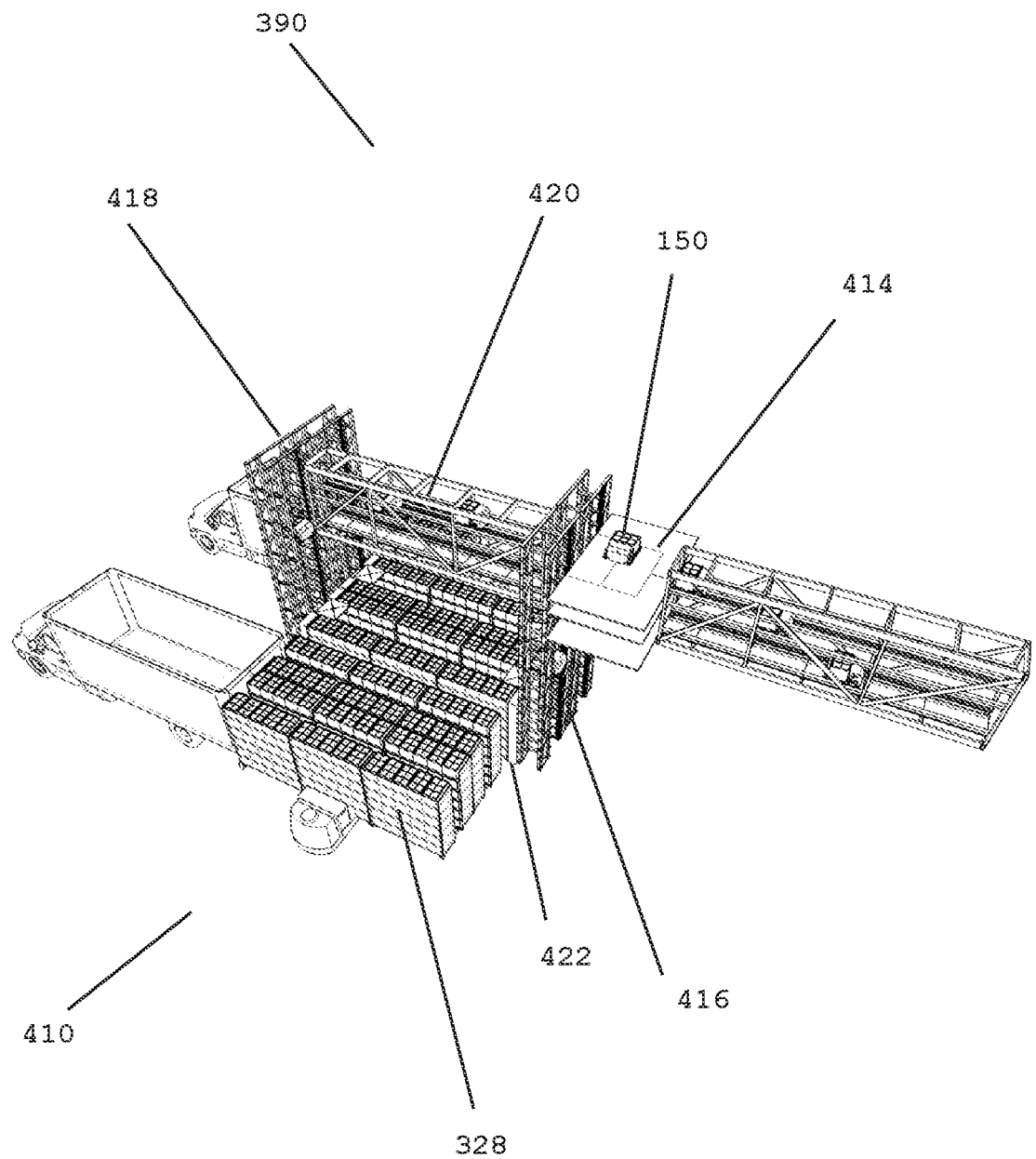
Figure 22:
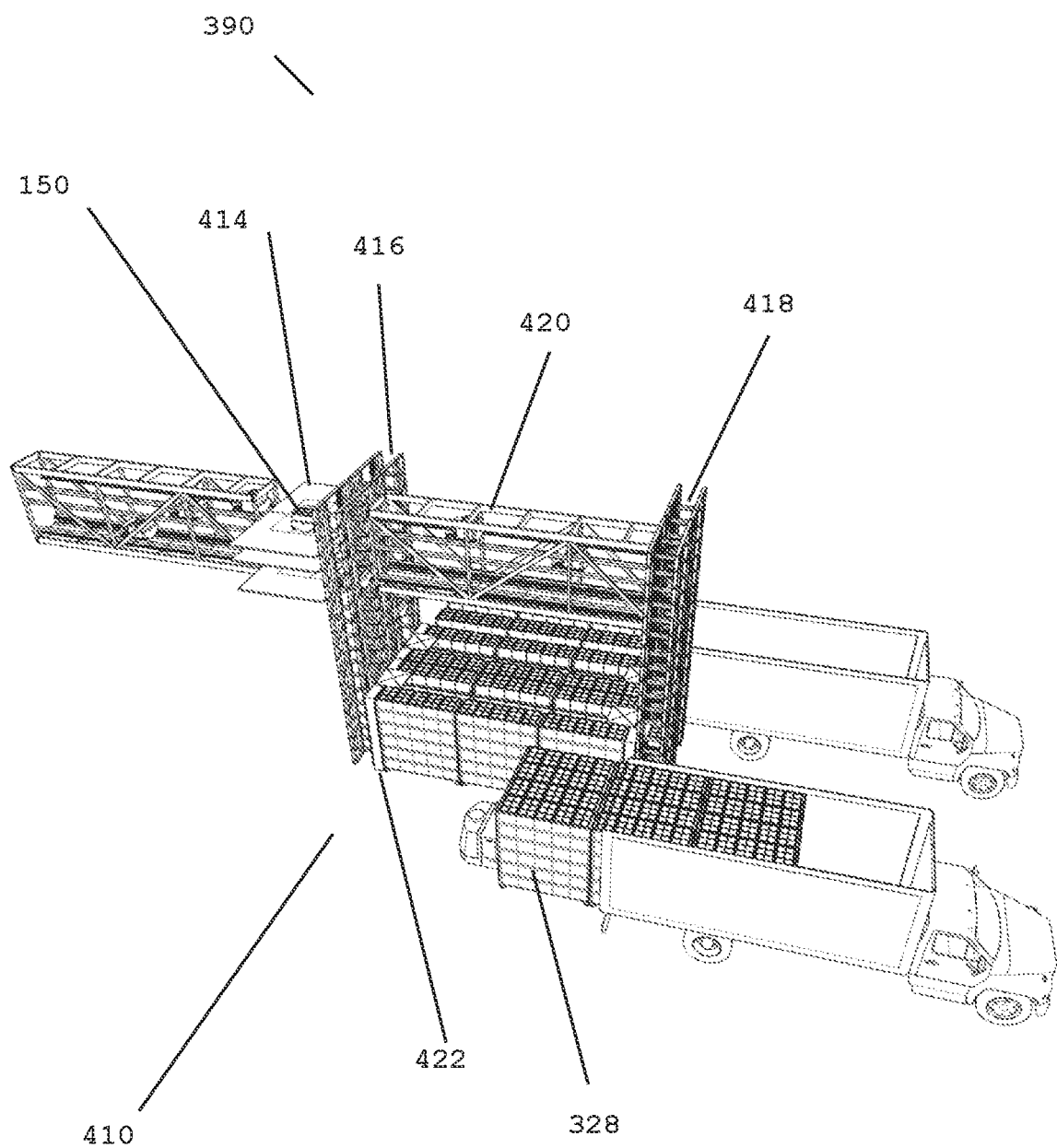

Referring now to FIG. 19 there is shown a top view of exemplary system 390 that utilizes widthwise insertion and extraction from a rack docking structure and length wise insertion and extraction from shipping truck boxes. Referring also to FIG. 20 there is shown a side view of exemplary system 390. Referring also to FIGS. 21 and 22 there are shown perspective views of exemplary system 390. System 390 has rack docking module 410 that has features similar to rack docking module 328 but with additional features as will be described. In the embodiment shown, rack docking module 410 has transit decks 414, first and second vertical towers 416, 418, transit rail 420 and docking interface structure 422. Transit decks 414 allow Bots 150 to access either of two vertical racks of first tower 416 that correspond to the two aisles of rack 328. Transit rails 420 allow Bots 150 to access either of two vertical racks of second tower 418 that correspond to the two aisles of rack 328. Docking interface structure 422 is provided for rack 328 to physically position and fasten to docking module 410 and may include safety blocking gates that may be provided to prevent Bots from accessing rack 328 from a vertical or horizontal direction respectively.

Incorporated Material

As noted above, the present technology may be used in the context of order fulfillment and automation-based technology, at least some of which is disclosed in published applications previously incorporated by reference and at least some of which is set forth below.

Figure 23A:
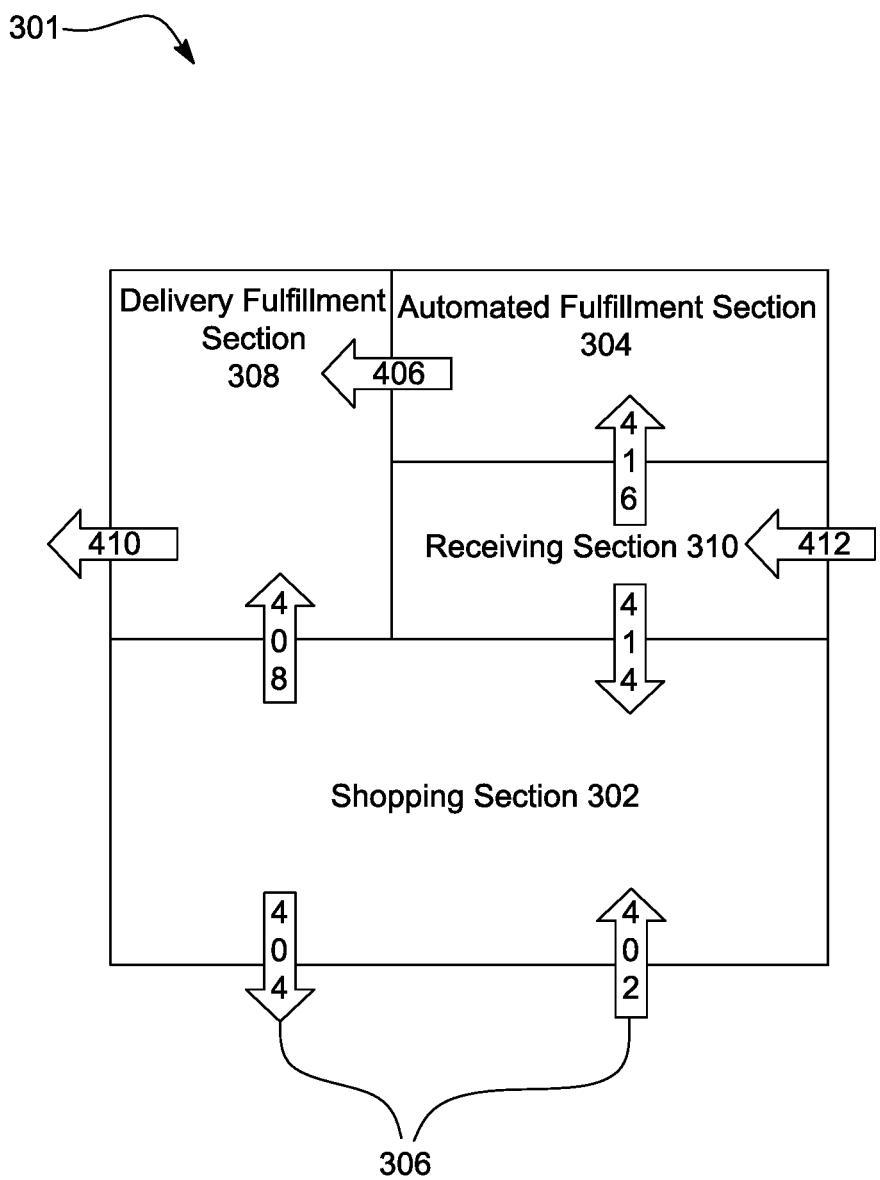
FIGS. 23A, 23B, and 23C are illustrative representations of an internal layout of a store for implementing the steps in accordance with the aspects of the invention.

For example, FIG. 23A depicts a representative conceptual internal layout of the store 301 and how each of the areas of the store 301 relates to one another. In particular, FIG. 23A depicts the shopping section 302, the automated fulfillment section 304, a delivery fulfillment section 308, and a receiving section 310. Although the different areas represented in FIG. 23A are represented within a single plane, the areas can be divided on multiple floors of a store 301, as depicted in FIGS. 3A-3C. During operation of the store 301, all transactions occur through one or more of these areas. In accordance with an example embodiment of the present invention, customers utilize the entrances 306 to enter 402 and exit 404 the shopping section of the store 301. Once inside the shopping section 302 of the store 301, customers can place orders for goods to be fulfilled by the automated order fulfillment 106 and can shop for non-fungible goods within the non-fungible goods fulfillment 104 section of the store, as discussed in greater detail herein.

Customer orders to be fulfilled by the automated order fulfillment 106 will be processed by the automated system within automated fulfillment section 304, as discussed in greater detail herein. When the automated order fulfillment 106 has been completed, the automated picked goods will be provided 406 to the delivery fulfillment section 308, as discussed in greater detail herein. Similarly, when customers have completed picking non-fungible goods within the shopping section 302, the customers will provide 408 the goods to the delivery fulfillment section 308, as discussed in greater detail herein. For example, the customers can place a tote or basket with their goods through a window to the delivery fulfillment section 308 as depicted in FIG. 5. At the delivery fulfillment section 308 goods provided 406 from the automated fulfillment section 304 and goods provided 408 from the shopping section 302 will be combined into a single order for delivery 410 to the customer, as discussed in greater detail herein.

Continuing with FIG. 23A, the store 301 can include the receiving section 310 for receiving goods from various suppliers and/or manufacturers. The receiving section 310 can be included within a "back end" of the store that is not seen by customers. When goods are delivered to the receiving section 310 the goods are identified as non-fungible goods for storage within the shopping section 302 or fungible goods for storage within the automated fulfillment section 304. The non-fungible goods will be transferred 414 to the shopping section and stored in a manner to provide non-fungible goods fulfillment 104. Similarly, the fungible goods will be transferred 416 and stored in a manner suitable for automated order fulfillment 106 (e.g., stored in totes and place into storage rack 612).

Figure 23B:
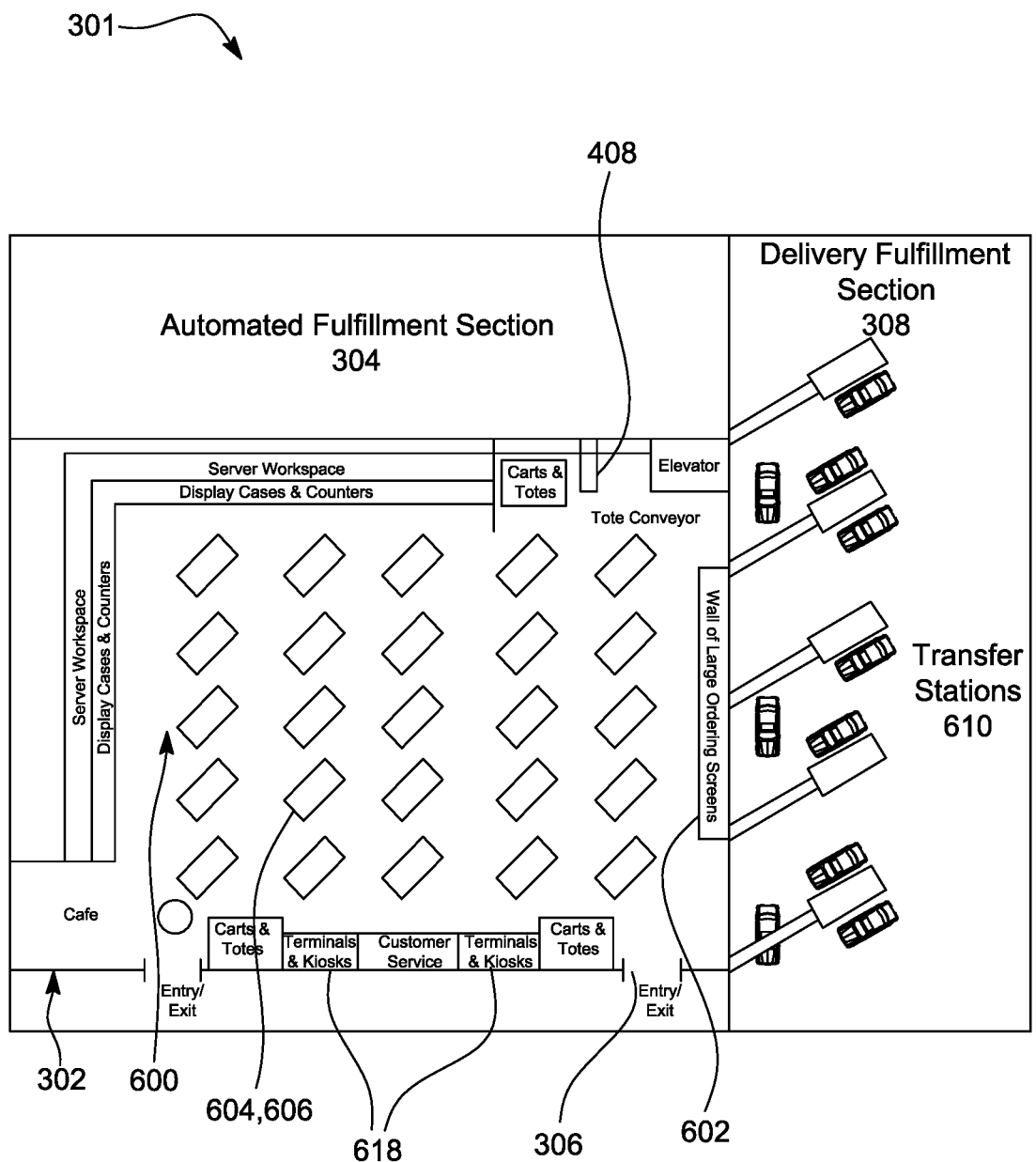

FIG. 23B depicts a more detailed view of the internal structure of the store 301 as discussed with respect to FIG. 23A. In particular, FIG. 23B depicts a detailed view of the shopping section 302, the delivery fulfillment section 308, a plan view of the automated fulfillment section 304, and how those sections relate to one another. The shopping section 302, as depicted in FIG. 23B, includes entry and exit points 306, a mock market 600, and a pass through 408 to the automated fulfillment section 304. The mock marketplace 600 includes a wall of ordering screens 602, a plurality of physical shelving units 604 and display cases of stands 606, and a plurality of shopping terminals and checkout kiosks 618. As would be appreciated by one skilled in the art, the mock marketplace 600 can include any combination of the elements depicted in FIGS. 23B-6C as discussed in greater detail herein. Additionally, FIG. 23B depicts the delivery fulfillment section 308 of the store 301. The delivery fulfillment section 308 includes a plurality of transfer stations 610 which completed orders of goods are delivered for acceptance by customers.

Figure 23C:
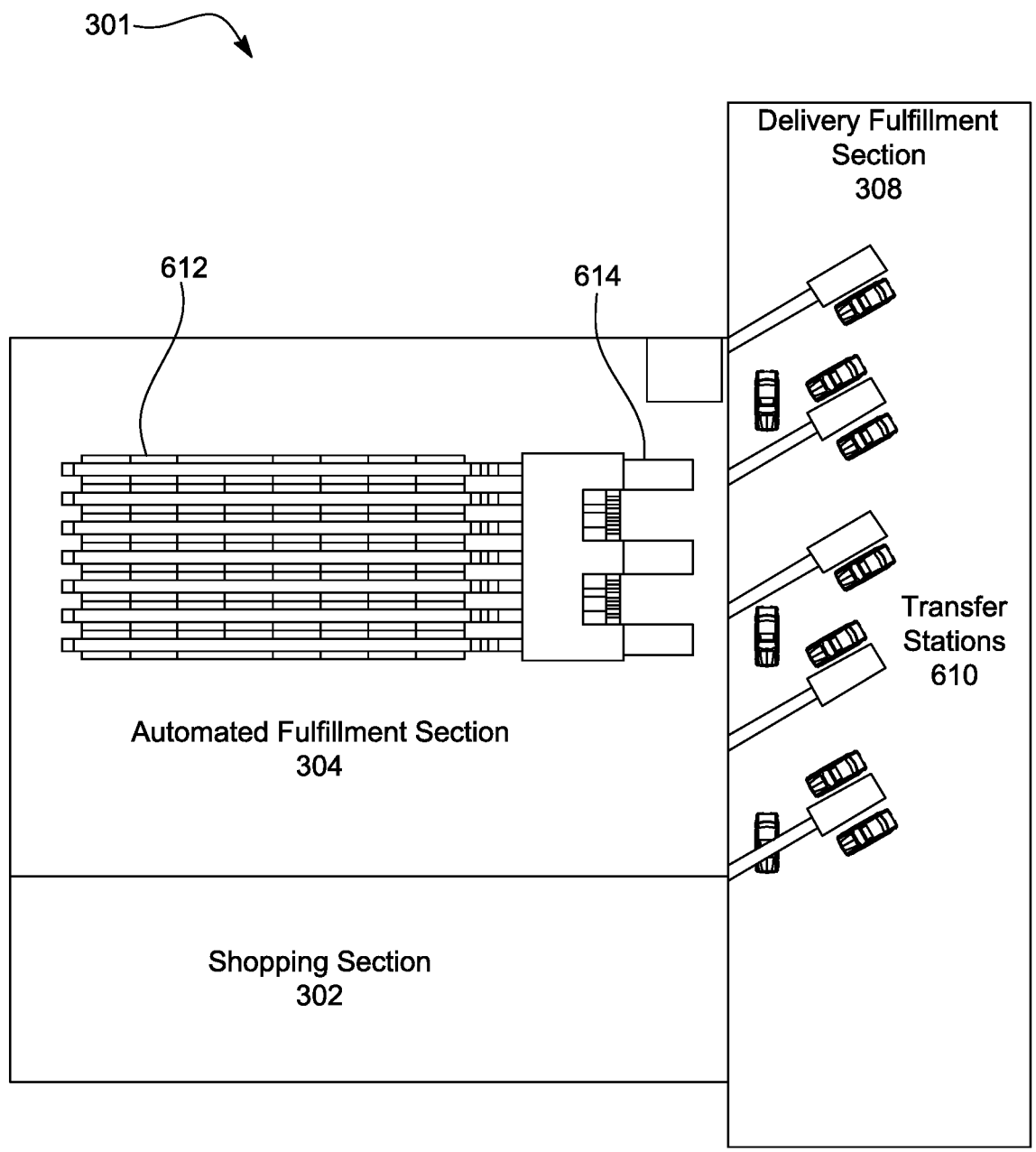

FIG. 23C depicts a more detailed view of the automated fulfillment section 304, the delivery fulfillment section 308, a basic view of the shopping section 302, and how those sections relate to one another. The automated fulfillment section 304 includes the storage rack 612 system configured to hold totes of inventory accessible by the robots 226 and further configured to enable the robots 226 to pull inventory totes and deliver the totes to pickers at picking workstations 614 for automated order fulfillment 106. In accordance with an example embodiment of the present invention, the delivery fulfillment section 308 includes a consolidation section in which goods from the automated fulfillment section 304 and goods from the shopping section 302 are combined and consolidated into order totes for delivery to customers at the transfer stations 610. As would be appreciated by one skilled in the art, the consolidation can occur within the same physical space as the automated fulfillment section 304 or in a separate physical space.

In accordance with an example embodiment of the present invention, the store 301 of the automated-service model includes a "front end" including an entry lobby, the shopping section 302 for non-fungible-goods, and associated work areas. As would be appreciated by one skilled in the art, the front end does not necessarily need to be located at a front of the store 301 or on a ground level of the store 301. The vast majority of floor space within the shopping section 302 is devoted to a non-fungible-goods market (e.g., produce, fresh goods and other non-fungible goods) and associated work spaces, which can be the focal point of the store 301 from a customer perspective. The shopping section 302 includes "non-fungible" goods such as produce, meat, seafood, many cheeses (primarily random-weight), deli, floral, bakery, and prepared foods. Typically, non-fungible goods will be sold from display fixtures or cases 606 with as many as three different pricing methods, including but not limited to "random dollar" (fungible with a price barcode), random weight (loose items, especially produce, priced based on item weight), and random count (loose items priced based on number of eaches). These non-fungible goods can also be sold at service counters that offer the customer more opportunity to customize ordered products according to their individual tastes and preferences.

In accordance with an example embodiment of the present invention, the shopping section 302 of the store 301 is similar in appearance to perimeter departments within traditional self-service grocery stores with technology enhancements, related to the automated-service model, to improve customer convenience and reduce retailer operating costs. The technological improvements for the shopping section 302 are primarily related to how customers shop for goods and exchange funds for those goods. One such technological improvement is the implementation of shopping terminals to be utilized in combination with the automated-service model. The shopping terminals are devices utilized by customers as the primary interface to select, scan, enter, and/or store goods for an order to be placed during shopping trip, including an exchange of funds for the order. In particular, the shopping terminals can be utilized to place orders for both fungible goods (to be picked by the automated order fulfillment 106) and non-fungible goods within the non-fungible goods fulfillment 104.

As would be appreciated by one skilled in the art, the shopping terminals can be any device configured to identify a particular good (e.g., via scan, photo, etc.) to be added to a shopping list. For example, the shopping terminals can be a portable scanning device or one or more fixed touch screens located within the shopping section 302. Additionally, user devices 224 (e.g., smart phones) of customers can be configured as shopping terminals by executing a mobile application associated with the store 301 on the mobile device. For purposes of this disclosure, the term "shopping terminal" is defined to include an application running on a user device 224 or a standalone specialized shopping terminal device (e.g., portable scanner, stationary screen, or a combination thereof). In operation, the shopping terminal interacts with the customer and communicates with the central automated service system 202 to support a broad set of functions involved in the shopping process. Each shopping terminal has a unique internal identifier that is included in messages, and the process of obtaining a shopping terminal includes a step in which the customer's identity is captured, e.g. via a radio frequency identification (RFID) key fob or an near field communication (NFC) chip in the customer's smart phone, or by entry of information at, e.g., a checkout kiosk 618 or service desk. The shopping terminal associated with the customer is used to pick the items desired for their shopping order to be picked by the automated order fulfillment 106 and by the customer within the non-fungible goods fulfillment 104.

In accordance with an example embodiment of the present invention, the shopping section 302 includes screens 602 representing a virtual fungible-goods market for ordering fungible goods to be picked by the automated order fulfillment 106. In particular, the virtual fungible-goods market combines the order processing 102 and non-fungible goods fulfillment 104 to enable a customer to select an order of goods to be picked by the automated order fulfillment 106. In accordance with an example embodiment of the present invention, the shopping section 302 includes a mock marketplace 600 with demo or sample products with SKUs (e.g., empty boxes, pictures, etc.) on physical shelving units (as typically found in a traditional market), or images of such goods made available for browsing of goods (electronic display, or tangible images or illustrations).

Figure 24:
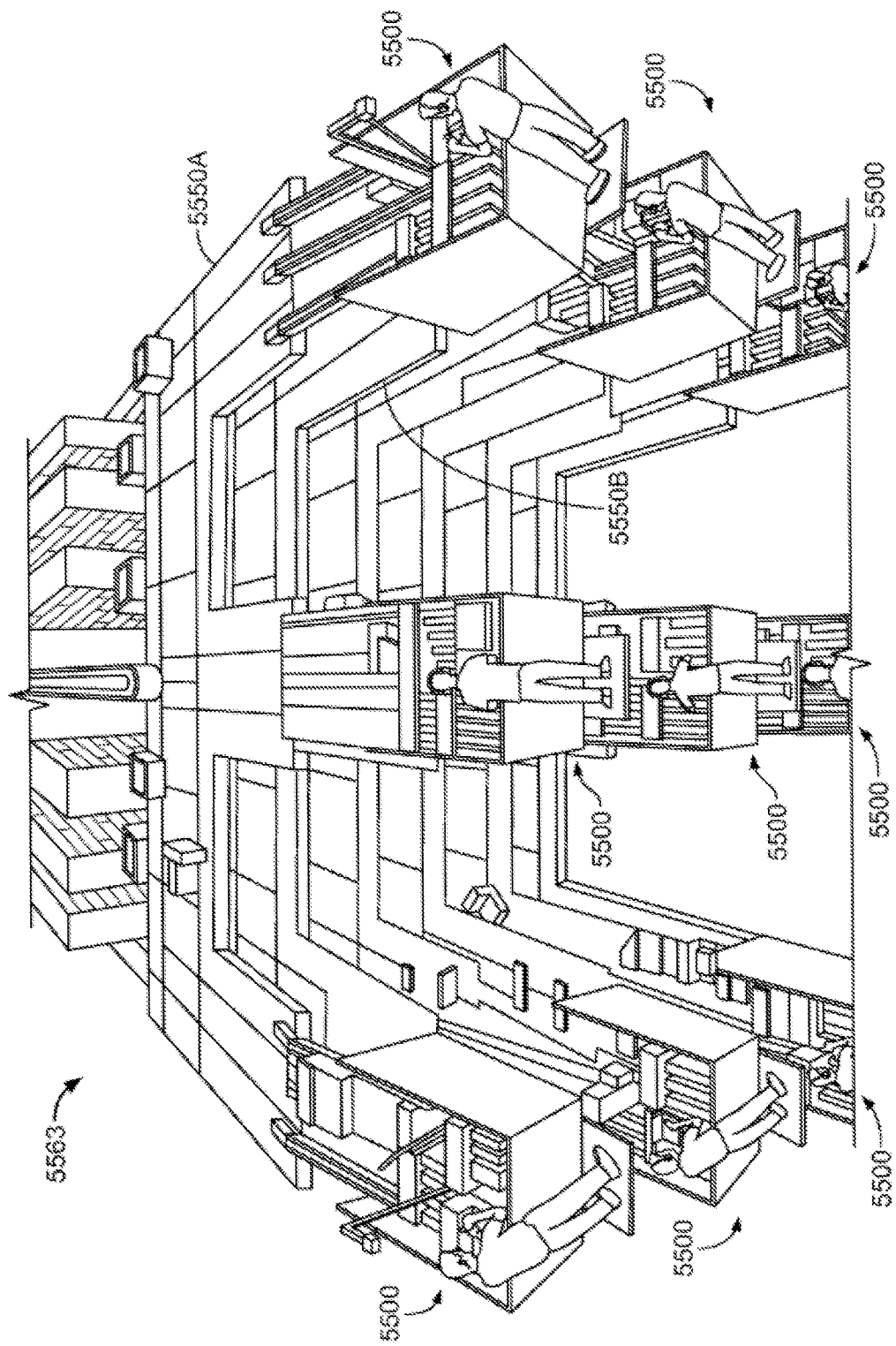
FIG. 24 is a schematic illustration of a portion of storage structure in accordance with aspects of disclosed embodiments.

Referring now to FIG. 24, an order fulfillment workstation 5500 is shown. While 9 workstations 5500 is shown in FIG. 24 it should be understood that the storage and structure 5563 (which is substantially similar to the storage structures described herein) may have any suitable number of workstations 5500. FIG. 24 illustrates an exemplary configuration of workstations 5500 where at least three workstations 5500 are disposed on each storage level, while in other aspects any suitable number of workstations may be disposed on each storage level. The workstations 5500 for the different levels may be vertically offset from one another such as being stacked one above the other or stacked in a staggered arrangement. In one aspect, each workstation 5500 is communicably connected to two transit decks 5550A, 5550B, while in other aspects each workstation 5500 may be communicably connected to any suitable number of transit decks. In one aspect, each transit deck 5550A, 5550B may correspond to a respective storage level while in other aspects the transit decks 5550A, 5550B may correspond to a common storage level (e.g. there is more than one transit deck associated with each storage/picking level). In another aspect, there may be towers that are located on or otherwise connected to (or disposed within) the transit decks (or aisles) that communicably connect one or more of the transit decks 5550A, 5550B (or aisles) of the different storage levels to from a travel loop with another tower so that bots may travers between the stacked transit decks 5550A, 5550B (or aisles) to any desired/predetermined level of the storage structure. The workstations 5500 are configured to accommodate a picker that transports one or more eaches from a tote (e.g. a P-tote) on one of the bots to a "put" location in a tote (e.g. an O-tote) on another one of the bots. The workstations 5500 may be arrayed at multiple elevations where human or robotic pickers remove eaches from product Totes (P-totes) and place them into either order Totes (O-totes) or a mobile robot, depending on the system configuration and in a manner substantially similar to that described above. A workstation 5500 is disposed at each transit deck level so that bots on each transit deck have access to a workstation 5500. In the exemplary aspect illustrated in FIG. 24 two transit deck levels 5550A, 5550B are shown connected to a common workstation 5500 however, in other aspects any suitable number of transit deck levels may be connected to a common workstation 5500.

Figure 25:
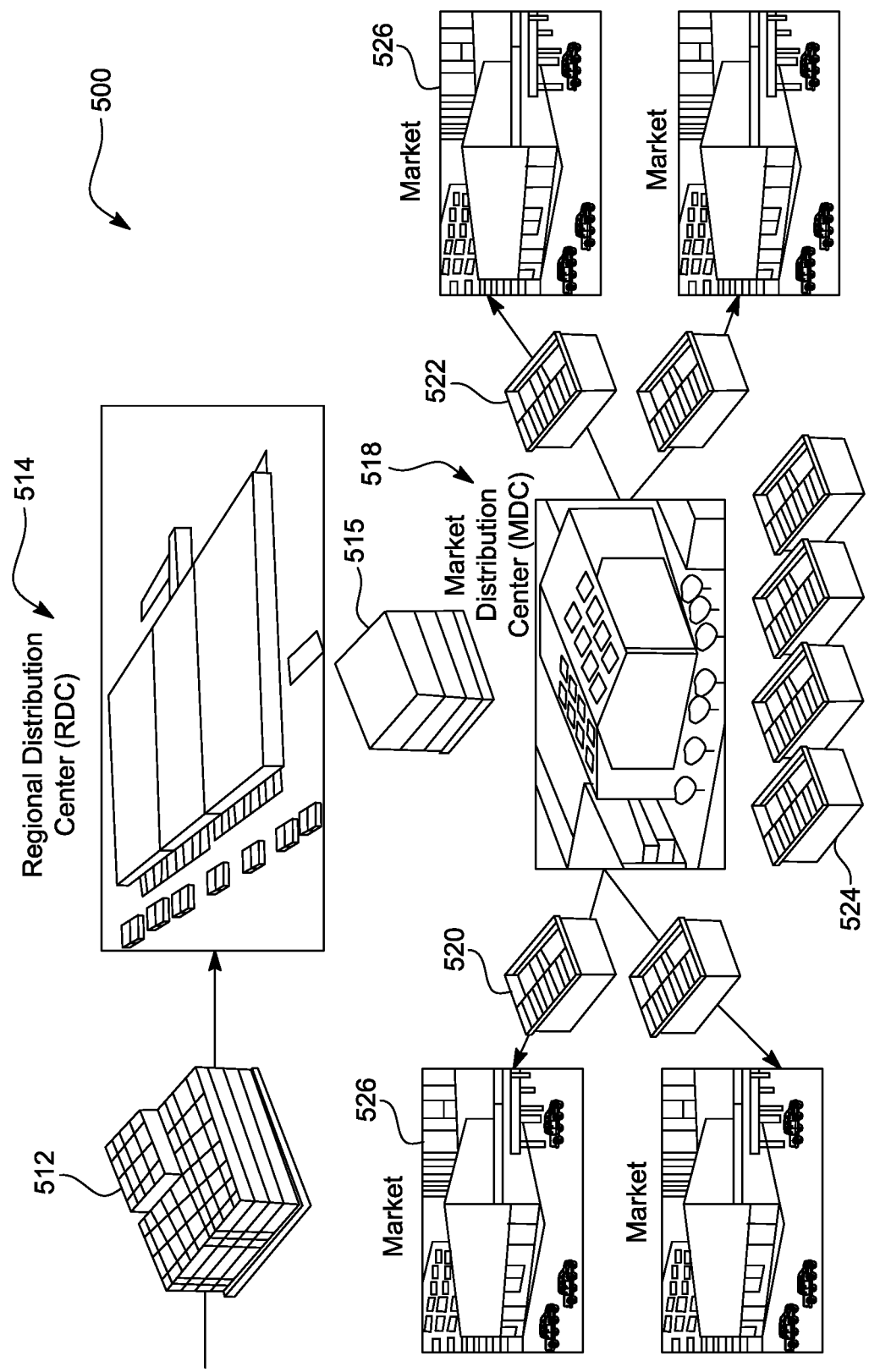
FIG. 25 is an illustrative system for implementing the steps in accordance with the aspects of the embodiments.

In accordance with the disclosed embodiments, an automated retail supply chain 500 (FIG. 25) enables market inventory reduction, item level traceability and manufacturer consignment. Here, rapid replenishment of SubTotes matched in size to market velocity (rate of sale of eaches) enables market to decrease inventory on-hand, and offer higher number of SKUs in same or smaller facility as opposed to where markets receive eaches in case or breakpack level not matched to their store velocity. Here, eaches are secured in an automated supply chain with full traceability from receiving of pallet from manufacturer at a Regional Distribution Center (RDC) to sale to customer in an order bag. Such an automated supply chain enables a consignment model where the manufacturer may maintain ownership of goods until the point of sale or delivery. Further, the manufacturer has real time visibility of their inventory via a unified commerce engine throughout the entire supply chain process. The manufacturer may also have access to customer trends and data. As seen in FIG. 25, palletized cases of goods 512 are received at one or more regional distribution center (RDC) 514 where the regional distribution center supplies palletized mixed cases of goods 516 to market distribution center (MDC) 518 where the market distribution center decants and stores like eaches in various sized subtotes 524 and supplies totes containing mixed each subtotes 520, 522 to market 526 as will be described in greater detail below. As an alternative, shipments may be made to stores or markets in Totes directly from the distribution center with no market distribution center or the function of the regional distribution center and market distribution centers may be combined. The market distribution center enables sufficient scale to afford automated decanting, as well as limits the cost of transporting eaches in totes and subtotes to a localized, for example metropolitan area. The more efficient shipping of eaches in densely pack cases on pallets can be maintained between the regional distribution center and the market distribution center. The market distribution center further offers the capability to store a large selection of goods that a customer may order to be delivered to their market on the next rapid replenishment delivery, that is not regularly stored at the market.

Figure 26:
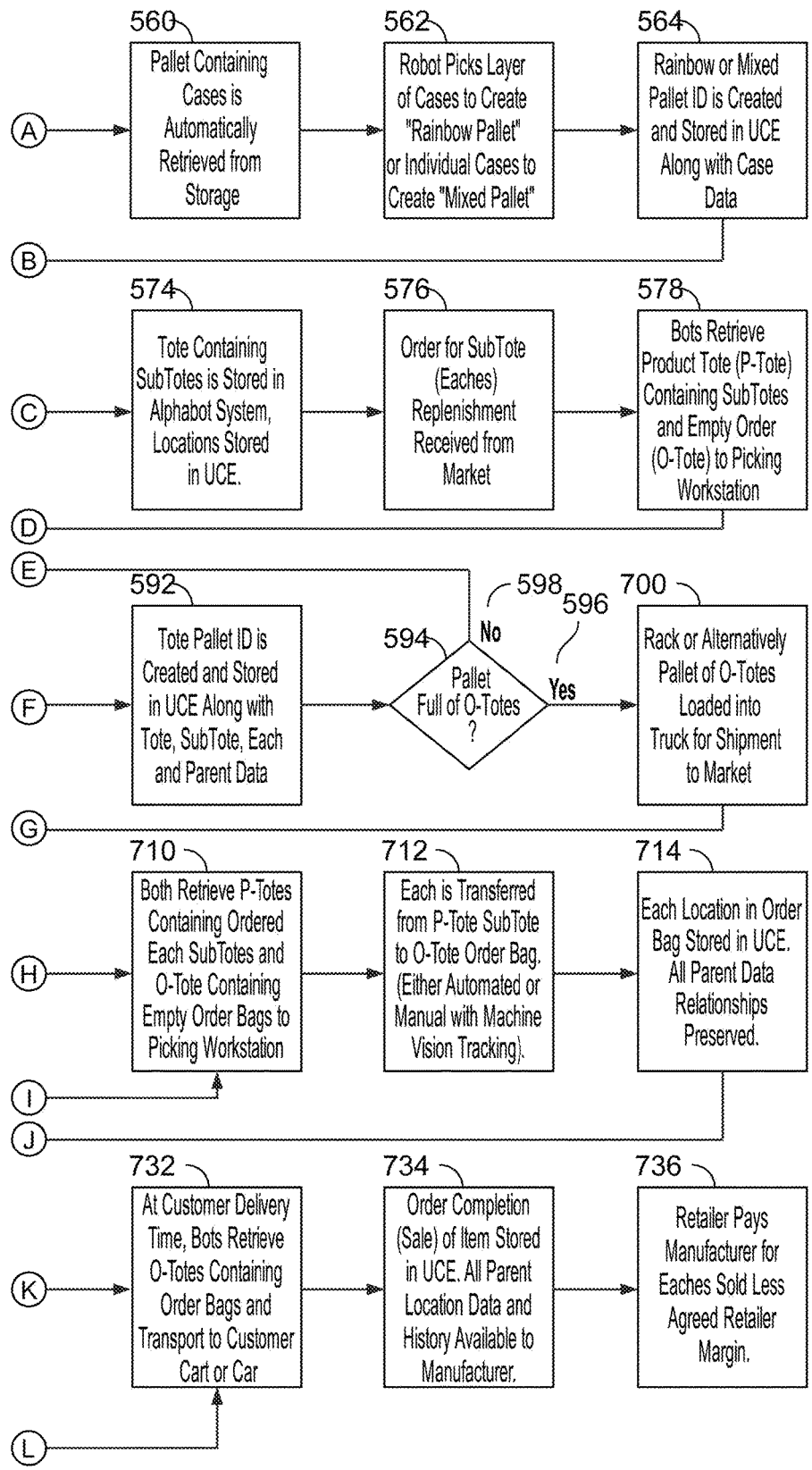
FIG. 26 (on two pages) is a process flow diagram.

Referring now to FIG. 26 (shown on two pages), there is shown process flow diagram 550. In 552, the manufacturer ships one or more pallet(s) containing cases of eaches to a Regional Distribution Center (RDC). In 554, the pallet ID along with case data is collected and stored in the Unified Commerce Engine (UCE). Pallet, case and item IDs may be barcode labels, RFID tags, or comparable tracking systems. In 556, the pallet is received within the RDC using an Automated Storage and Retrieval System (AS/RS), Alphabot PalletBot. In 558, an order for case replenishment is received from the Market Distribution Center (MDC). In 560, a pallet containing Cases is automatically retrieved from storage. In 562, a robot picks a layer of cases to create a "Rainbow Pallet" or individual cases to create a "Mixed Pallet". In 564, a rainbow or mixed pallet ID is created and stored in the UCE along with case data. In 566, a rainbow or mixed case pallet is received at the MDC. In 568, the UCE calculates a distribution of eaches per subtote (SubTote size) based on served market each velocities. In 570, cases are automatically decanted into a distribution of subtotes sizes and totes of MDC with the Alphabot system. In 572, each data, along with associated parent case and pallet ID, and now subtote and tote ID are stored in the UCE. In 574, the tote containing subtotes is stored in the Alphabot system and corresponding locations stored in the UCE. In 576, the order for SubTote (Eaches) replenishment is received from the market. In 578, bots retrieve product tote (P-Tote) containing SubTotes and empty Order Tote (O-Tote) to a Picking Workstation. In 580, SubTotes are automatically transferred from P-Tote to O-Tote. In 582, subtote and each location are stored in the UCE. In 582, all upstream parent case and pallet data relationships are preserved. In decision 584, is the O-Tote full of P-Totes? If Yes 586 then go on to 590. If No 588 then go to 580. In 590, a bot transports mixed SKU O-Tote to and loads the tote into a rack or alternatively presents to robot to stack on a pallet. In 592, a tote pallet ID is created and stored in the UCE along with the Tote, SubTote, Each and Parent Data. In decision 594, is the pallet full of O-Totes? If Yes 596 then go to 700. If No 98 then go to 90. In 700, the rack or alternatively pallet of O-Totes is loaded into a truck for shipment to market. In 702, the rack or pallet of O-Totes is received at Market and the Totes are transferred automatically into the Market Alphabot System. In 704, the SubTote and Each Location is stored in UCE where all upstream Parent Case and Pallet Data relationships are preserved 704. In 706, a customer order is received and scheduled for picking. In 708, the Material Control System (MCS) calculates the order bag packing distribution and sequence. In 710, bots retrieve P-Totes containing ordered Each SubTotes and O-Tote containing empty order bags to a picking workstation. In 712, each is transferred from P-Tote SubTote to O-Tote Order Bag either in an automated fashion or manual fashion with machine vision tracking. In 714, the Each Location in Order Bag is stored in the UCE where all parent data relationships are preserved. In decision 716, are all Eaches transferred to Order Bags 716? If Yes 718 then go to 722. if No 720 the go to 710. In decision 722, is customer delivery scheduled 722? If Yes 724 then go to 732. If No 726 then go to 728. In 728, the Order Tote containing Order Bags is stored in the Alphabot system. In 730, the Order Location, and all Each and associated Parent Data is stored in the UCE. In 732, at Customer delivery time, Bots retrieve O-Totes containing Order Bags and transport to Customer Cart or Car. In 734, order completion (Sale) of the item is stored in the UCE where all parent location data and history is available to the manufacturer of the item(s). In 736, the retailer pays the manufacturer for eaches sold less an agreed retailer margin 736. In the disclosed method, the UCE calculates a distribution of eaches per subtote (subtote size) based on served market each velocities. The distribution of eaches, the watermark for replenishment and the replenishment rate may be modified by the UCE as a function of velocity for the given SKU where the UCE may employ a drawdown rate monitor or a drawdown rate of change of velocity monitor. Here, the level of inventory for a given SKU at a given market or store may be maintained at an optimized watermark that can be variable as a function of velocity or otherwise to optimize in order to present the highest number of SKU's based on storage area or otherwise.

In addition to the manufacturer being aware of the location of every each from the time it leaves their manufacturing facility, until it is delivered to the customer, the manufacturer may access the UCE database to determine the velocity of their product sales at all locations, customer buying trends and data. The manufacturer may utilize the near real-time UCE data to optimize their manufacturing schedule, shipping schedule, product offering by geography, and product attributes; e.g. flavors, sizes, bundles, etc.

Figure 27:
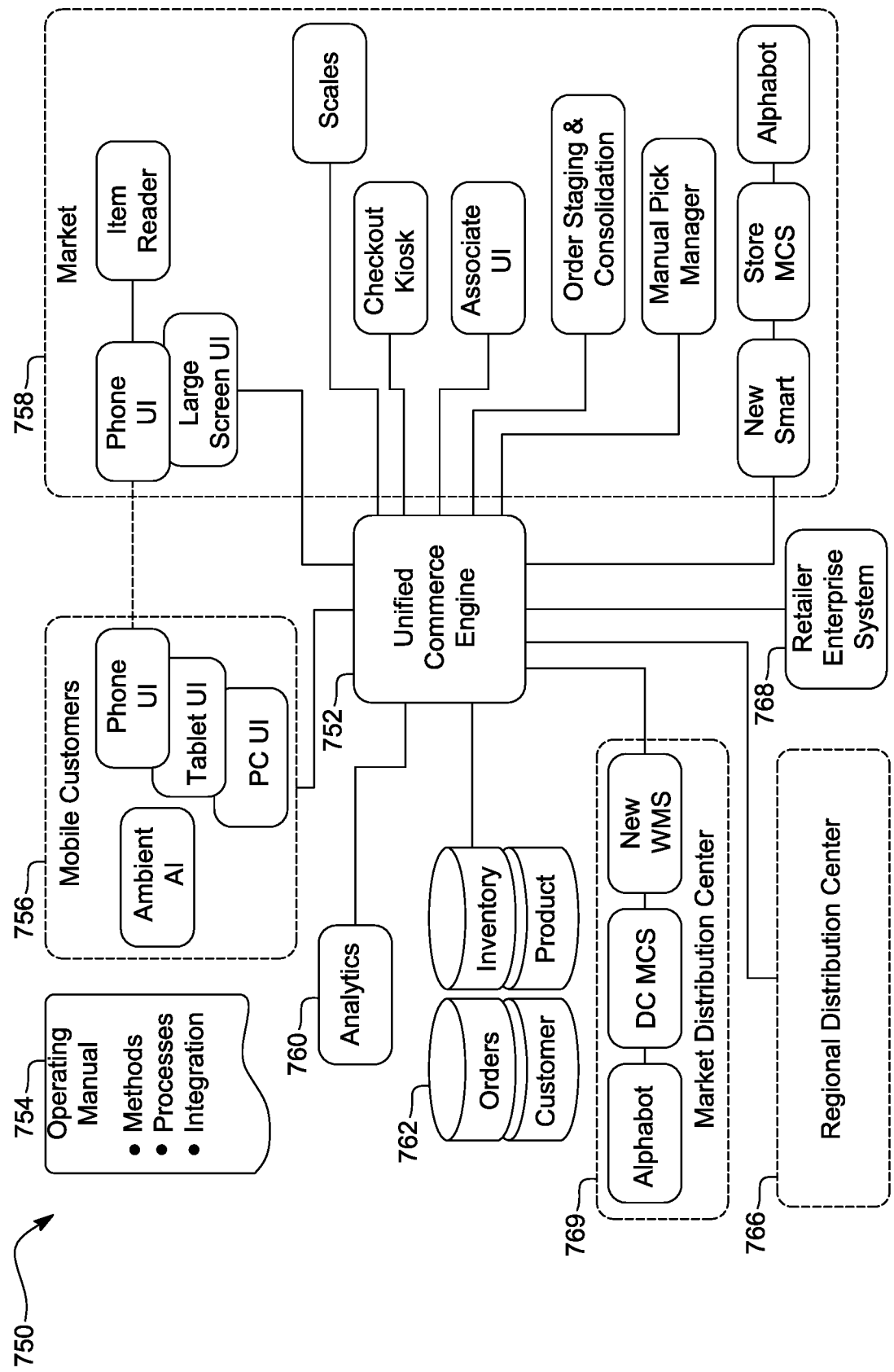
FIG. 27 is an illustrative system for implementing embodiments.

Referring now to FIG. 27 is an illustrative system 750. As described, a unified commerce engine 752 may centrally manage and track inventory levels and distribution. System 750 may have operating manual 754 identifying systems, processes and integration. Mobile customers 756 may be provided with ambient AI, phone UI, Tablet UI and PC or other suitable UI that interfaces with UCE 752 or other UI's, for example, a market or store UI. Market 758 may be provided with phone UI, item reader, large screen UI, scales, checkout kiosk, associate UI, order staging and consolidation, manual pick manager new SMART store MCS, and an Alphabot storage system. Analytics 760 may further be provided. Orders, customers, inventory and product 762 may further interface with UCE 752. MDC 764 with Alphabot storage and retrieval system, DC MC and new warehouse management system (WMS) may further interface with UCE 752. RDC 766 and Retailer enterprise systems 768 may further interface with UCE 752.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated.

We claim:

1. A racking system configured to operate with an automatic storage and retrieval system (ASRS) having mobile robots transferring containers to and from storage locations in a storage structure, the racking system comprising:
   a first tote support structure; and
   a second tote support structure, the first and second tote support structures capable of moving with respect to each other between a first position where the first and second tote support structures are configured with an aisle between the first and second tote support structures and configured to receive containers from a mobile robot of the mobile robots from the ASRS travelling within the aisle, and a second position where the first and second tote support structures are compacted for transport;
   wherein the racking system is configured to be shipped in the first position with totes stored in the first and/or second tote support structures and one or more mobile robots positioned within the aisle between the first and second tote support structures.

2. The racking system of claim 1, further comprising a collapsing guide structure affixing the first and second tote support structures to each other.

3. The racking system of claim 2, wherein the collapsing guide structure collapses as the first and second tote support structures move from their first position to their second position.

4. The racking system of claim 1, wherein the racking system is configured to be shipped in the second, compacted position with totes stored in the first and/or second tote support structures.

5. The racking system of claim 1, wherein the first and second tote support structures are configured to mount to a fixture enabling mobile robots to load totes onto the first and/or second tote support structures, and/or unload totes from the first and/or second tote support structures.

6. The racking system of claim 1, further comprising a first plurality of storage shelves for storing totes in the first tote support structure and further comprising a second plurality of storage shelves for storing totes in the second tote support structure.

7. The racking system of claim 6, wherein the first and second plurality of storage shelves are configured to store totes lengthwise or widthwise.

8. The racking system of claim 7, wherein a footprint of the racking system when in the second compacted position is smaller when the totes are stored widthwise as compared to when the totes are stored lengthwise.

9. An automated storage and retrieval system (ASRS), comprising:
   a first plurality of storage shelves arranged in an array of rows and columns;
   a second plurality of storage shelves arranged in an array of rows and columns;
   an aisle separating the first and second plurality of storage shelves, the first plurality of storage shelves, the second plurality of storage shelves and aisle together configured to allow a mobile robot to travel vertically and horizontally within the aisle to transfer containers to and from any of the first and second plurality of storage shelves;
   a first section of the first plurality of storage shelves and a second section of the second plurality of storage shelves together being removable as a modular section, the modular section configured to move between a first position, where the first and second sections are spaced apart from each other and configured to receive the mobile robot therebetween, and a second position where the first and second sections are compacted toward each other for transport of the modular section away from the ASRS.

10. The ASRS of claim 9, further comprising a collapsing guide structure affixing the first and second sections of the modular section to each other.

11. The ASRS of claim 10, wherein the collapsing guide structure collapses as the first and second sections of the modular section move from their first position to their second position.

12. The ASRS of claim 9, wherein the first and second sections of the modular section comprise a first set of guide rails that align with a second set of guide rails in a remainder of the first and second plurality of storage shelves not including the modular section, the first and second sets of guide rails enabling mobile robots to travel freely between the first and second sections and the remainder of the first and second plurality of storage shelves while the modular section is affixed as part of the first and second plurality of storage shelves.

13. The ASRS of claim 9, a face of the modular section defining a plane, and wherein the modular section is configured to be removed widthwise, perpendicular to the plane.

14. The ASRS of claim 9, a face of the modular section defining a plane, and wherein the modular section is configured to be removed lengthwise, parallel to the plane.

15. The ASRS of claim 9, further comprising an automated motorized robot for removing the modular section from the ASRS.

16. An automated storage and retrieval system (ASRS), comprising:
   a plurality of modular racks, each modular rack comprising:
   a first tote support structure, and
   a second tote support structure, the first and second tote support structures capable of moving with respect to each other between a first position where the first and second tote support structures are configured with an aisle between the first and second tote support structures and configured to receive containers from a mobile robot travelling horizontally within the aisle at one of multiple levels, and a second position where the first and second tote support structures are compacted for transport; and
   a rack docking module configured to affix to an end of one or more of the plurality of modular racks, the rack docking module raising and lowering the mobile robot to travel at different levels of the multiple levels between the first and second support structures.

17. The ASRS of claim 16, further comprising a dock interface structure configured to connect one or more of the plurality of modular racks to the rack docking module.

18. The ASRS of claim 17, wherein the dock interface structure comprises blocking gates configured to move between a closed position where the blocking gates prevent passage of mobile robots between the one or more modular racks and the rack docking module, and an open position where the blocking gates allow passage of mobile robots between the one or more modular racks and the rack docking module.

19. The ASRS of claim 16, wherein the rack docking module comprises a first rack docking module and the end of the one or more modular racks comprises a first end;
the ASRS further comprising a second rack docking module affixed to a second end of one or more of the plurality of modular racks opposite the first end, the first and second rack docking modules raising and lowering the mobile robot to travel at different levels of the multiple levels between the first and second support structures.

20. The ASRS of claim 16, wherein the plurality of rack modules comprise two or more rack modules arranged lengthwise end to end.

21. The ASRS of claim 20, further comprising a first set of rails in a first of the two or more rack modules and a second set of rails in a second of the two or more rack modules, the first and second sets of rails aligned with each other to allow passage of the mobile robot horizontally between the first and second rack modules.

22. The ASRS of claim 16, wherein the plurality of rack modules comprise two or more rack modules arranged widthwise back-to-back.

23. The ASRS of claim 22, further comprising a deck affixed to the rack docking module, the deck enabling mobile robots to travel between the two or more rack modules arranged widthwise back-to-back.

\* \* \* \* \*